(12) United States Patent
Samain et al.

(10) Patent No.: US 12,206,715 B2
(45) Date of Patent: Jan. 21, 2025

(54) ACTIVE SPEAKER TRACKING USING A GLOBAL NAMING SCHEME

(71) Applicant: Cisco Technology, Inc., San Jose, CA (US)

(72) Inventors: Jacques Samain, Paris (FR); Giovanna Carofiglio, Paris (FR); Giulio Grassi, Paris (FR); Enrico Loparco, Boulogne-Billancourt (FR); Michele Papalini, Issy les Moulineaux (FR)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/400,842

(22) Filed: Dec. 29, 2023

(65) Prior Publication Data

US 2024/0223621 A1 Jul. 4, 2024

Related U.S. Application Data

(63) Continuation of application No. 17/320,606, filed on May 14, 2021, now Pat. No. 11,863,592.

(51) Int. Cl.
*H04L 65/1023* (2022.01)
*H04L 65/1059* (2022.01)
(Continued)

(52) U.S. Cl.
CPC ........ *H04L 65/103* (2013.01); *H04L 65/1059* (2013.01); *H04L 65/1083* (2013.01);
(Continued)

(58) Field of Classification Search
CPC ....... H04L 65/103; H04L 65/75; H04L 65/70; H04L 65/1101; H04L 65/1059; H04L 65/1083
See application file for complete search history.

(56) References Cited

U.S. PATENT DOCUMENTS

| | | | |
|---|---|---|---|
| 2008/0312923 A1* | 12/2008 | Crinon | H04M 3/569 704/E15.001 |
| 2014/0040777 A1 | 2/2014 | Jones et al. | |

(Continued)

OTHER PUBLICATIONS

Office Action for U.S. Appl. No. 17/320,606, mailed on Mar. 30, 2023, Inventor #1 Jacques Samain, "Active Speaker Tracking Using a Global Naming Scheme," 8 pages.

*Primary Examiner* — Elton Williams
(74) *Attorney, Agent, or Firm* — Lee & Hayes, P.C.

(57) ABSTRACT

A method includes, at a media bridge configured to distribute a plurality of media streams among a plurality of client devices connected to the media bridge over a network, receiving the plurality of media streams from the plurality of client devices via the media bridge. The media bridge connects the plurality of client devices. The method further includes assigning a pair of names for each of the plurality of media streams. The pair of names include a contribution name and a distribution name. The method further includes presenting a first list to the plurality of client devices. The first list including a plurality of the distribution names for the plurality of media streams received from the plurality of client devices. The method further includes providing an indication of a current active speaker within the plurality of media streams via a signaling process.

20 Claims, 12 Drawing Sheets

(51) Int. Cl.
*H04L 65/1083* (2022.01)
*H04L 65/1101* (2022.01)
*H04L 65/70* (2022.01)
*H04L 65/75* (2022.01)

(52) U.S. Cl.
CPC .......... *H04L 65/1101* (2022.05); *H04L 65/70* (2022.05); *H04L 65/75* (2022.05)

(56) References Cited

U.S. PATENT DOCUMENTS

| | | |
|---|---|---|
| 2014/0344378 A1 | 11/2014 | Chakraborti et al. |
| 2018/0146160 A1 | 5/2018 | Kang et al. |
| 2018/0241671 A1* | 8/2018 | Bosch .................... H04L 69/22 |
| 2020/0204605 A1 | 6/2020 | Papalini et al. |

* cited by examiner

ACTIVE SPEAKER TRACKING USING A GLOBAL NAMING SCHEME

RELATED APPLICATIONS

This patent application is a continuation of and claims priority to U.S. patent application Ser. No. 17/320,606, filed May 14, 2021, which is fully incorporated herein by reference.

TECHNICAL FIELD

The present disclosure relates generally to real-time communications (RTC) over an Information Centric Networking (ICN) network or a hybrid Information Centric Networking (hICN) network. Specifically, the present disclosure relates to systems and methods for creating a naming scheme for participants utilizing the RTC and tracking active speakers during the RTC.

BACKGROUND

Real-Time Communications (RTC) architectures may leverage point-to-point transport protocols such as the Transmission Control Protocol (TCP) or the Universal Datagram Protocol (UDP). These transport protocols have no awareness of the multi-point and real-time nature of an RTC application. RTC applications such as, for example, Web Real-Time Communications (WebRTC), includes any type of communications systems and methods including associated software protocols and communication hardware media that provides real-time guarantees of real-time computing communications. Thus, RTC including WebRTC provides ultra-low-latency media streaming and emerges as a promising option when compared to other communication schemas such as, for example, HyperText Transfer Protocol (HTTP) live streaming technologies including HTTP Live Streaming (HLS) or the Moving Picture Experts Group (MPEG) Dynamic Adaptive Streaming over HTTP (MPEG/DASH), which fail to go below the few second timescale imposed by the chunk granularity. RTC systems and methods (including software) may provide a limited set of user interface (UI) layouts to the user. For example, a "speaker view" and/or a "mosaic view" of the individuals participating in the RTC instance may be provided, and some customization of a UI layout, such as, for example, pinning video feeds of specific users within the UI layout. However, the level of customization of the UI layout is still limited. A fully customizable UI layout where a user may select which of a plurality of media streams (e.g., instances of video/screen sharing from other participants) to display in their UIs presented on their respective computing devices.

WebRTC applications may provide ICN-based or hybrid ICN-based RTC systems for naming schemes for naming participants and their respective media streams. Further, WebRTC applications may provide ICN-based or hybrid ICN-based RTC systems for requesting media streams in WebRTC applications. However, in these WebRTC applications, the naming schemes may fail to provide customization of UI layouts because only a subset of the participants' streams are distributed corresponding to the list of the active speakers. In contrast, for a customizable UI layout, all streams should be available in distribution.

Further, although WebRTC does not use any naming scheme to distribute content, the naming schemes used by WebRTC applications utilizing ICN networking techniques includes instances where the media streams sourced from the same participant may be distributed under different names. For example, participant A may be the main active speaker within the WebRTC instance. In this scenario, the media stream generated by participant A may be distributed using two different names such as a name related to the active speaker (e.g., /call_x/video/active_speaker_1) and one that refers directly to participant A (e.g., /call_x/video/user_A). These two different names may be used if someone wants to receive the media stream from participant A, even when participant A is not an active speaker. Using this naming scheme, the same media stream may need to be duplicated, resulting in a waste of bandwidth and increasing the central processing unit (CPU) load on a server computer.

Still further, WebRTC applications may include the ability to create breakout rooms (e.g., meetings within a meeting) where participants of the global meetings may be divided into groups participating in a number of sub-meetings. However, these sub-meetings are independent from the global meeting, and a participant in a sub-meeting cannot hear what is happening in the main meeting.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Figure 1:
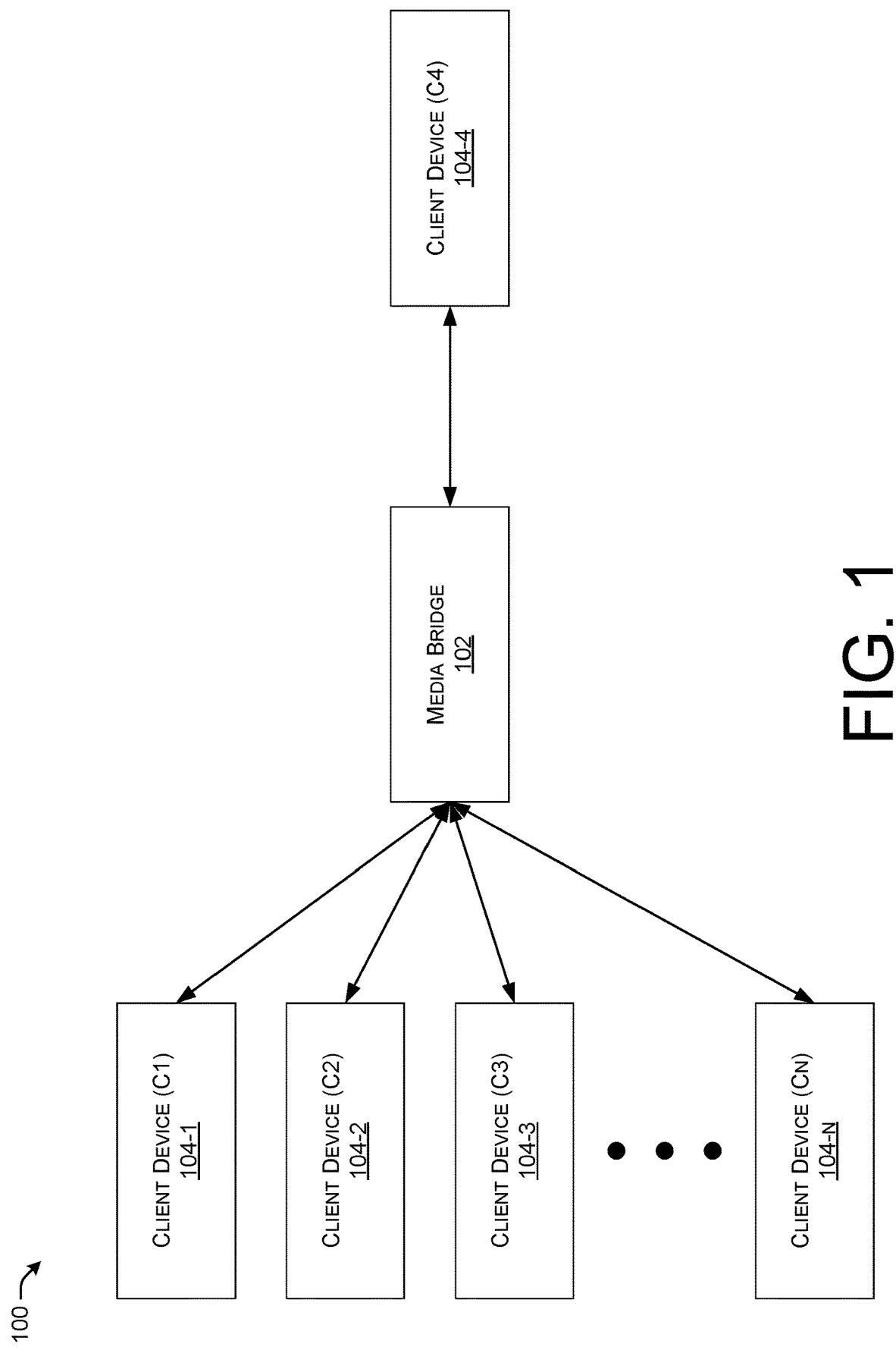
FIG. 1 illustrates a system-architecture diagram of a hybrid information-centric network (hICN)-based real-time communication (RTC) system, according to an example of the principles described herein.

The present systems and methods provide a naming scheme and a method to track a number of active speaker(s) in a manner that is efficient, effective, and compatible with a customizable UI layout presented on a client device. Further, the present systems and methods eliminate the duplication of media streams. Still further, the present systems and methods effectively manage a plurality of different sub-meetings within a given global meeting by leveraging a naming scheme that singularly identifies a media stream.

Presented herein are systems and methods to leverage a named-based approach inspired by hICN to provide an RTC-aware transport and a network-layer naming approach based on RTC participants and active speakers that enables more efficient and scalable media distribution. Information-centric networking (ICN) architectures such as named-data networking (NDN). FD.io Community ICN (CICN), or hybrid ICN (hICN) introduce location-independent names at the network layer and use them as communication identifiers in place of host locators for a more efficient, mobility-robust, and secure content-based communication.

Beyond the use of a hierarchical structure for efficient aggregation, naming is not specified in ICN Internet Resource Task Force (IRTF) specifications, but is left up to the application to decide naming conventions on an ad-hoc basis given also the underlying constraints specific to the selected ICN design (i.e, fixed or variable size length, encoding in a new proposed header as for NDN or in existing IP headers as for hICN).

The encoding of application semantics into network names in ICN architectures is an operation that may have significant implications on security, scalability, mobility, caching and reliability aspects of the resulting ICN-enabled application design. The techniques presented are for naming and requests in ICN-based RTC systems or hICN-based RTC systems. These systems may include, for example, hICN-RTC for WebRTC applications. Further, these systems may include, for example, WebEx online meeting applications developed and distributed by Cisco Systems. Inc. Still further, these systems may include, for example, the Jitsi multiplatform voice (VOIP), video conferencing and instant messaging applications developed and distributed as open source software. Even still further, these systems may include, for example. Microsoft® Teams® communication platform developed and distributed by Microsoft Corporation. Further, these systems may include, for example. Zoom® videoconferencing application developed and distributed by Zoom Video Communications, Inc. Any ICN-based RTC, hICN-based RTC, proprietary, and/or WebRTC systems may be used in connection with the present systems and methods. The examples described herein may be referred to as RTC systems and/or services, and an instance thereof may be referred to as an RTC instance.

The present systems and methods define an appropriate hICN naming and dynamic request scheme to address multimedia audio/video flows of active speakers in one or multiple qualities, dynamic change of active speakers, and dynamic change of user displayed layouts. A client device may be provided with a media stream of a current active speaker or a non-active speaker based on client device interaction within an hICN-based RTC computing environment. The techniques presented herein may, in one example, employ a media bridge architecture (e.g., a Selective Forwarding Unit (SFU) media bridge architecture) with the additional benefit that the solution cost scales with the number of active speakers in a video call. This is obtained due to the hICN network architecture that affords a number of properties including mapping each media source to a pair of network names including contribution name and a distribution name, causing the media bridge to pull media from the active speakers, causing each participant to pull the active speakers media by pulling data from the active speakers' namespace, allowing for a client device to request a media stream of a client device of a non-active speaker, updating a list of participating client devices as and providing in-meeting group management utilizing the assigned distribution names.

The above properties are unique to the hICN networking architecture and cannot be reproduced using a simple UDP or TCP socket over Internet Protocol (IP). This allows for reducing the overall traffic significantly because it scales only with the active speakers' traffic and not with traffic generated by all participants. Furthermore, the overall traffic reduction reduces congestion and improves media quality, hICN uses the contribution name and the distribution name of each client device, and a transport that is connectionless, attached to the contribution names and the distribution names. An hICN-based RTC system includes modifications to existing RTC solutions (such as WebRTC, the WebEx® online meeting service, and the Jitsi RTC software, among other online RTC services. These modifications may include a name-based communication at a network and a transport layer. In the examples described herein, the hICN-based RTC system introduces named-sockets both at the client and at the media bridge to identify media flows, and a pull-based connectionless transport based on such names. Data packets produced by one client device are pulled by the requests of other client devices relayed by a media bridge. Flow and congestion control are delegated to the transceiver.

Overview

In the examples described herein, methods, systems, and non-transitory computer-readable medium storing instructions that, when executed, causes a processor to perform operations to provide a client device with a media stream of a current active speaker or a non-active speaker based on client device interaction within an ICN-based RTC computing environment.

Examples described herein provide a method including, at a media bridge configured to distribute media streams among a plurality of client devices connected to the media bridge over a network, receiving a plurality of media streams from the plurality of client devices via the media bridge. The media bridge connects the plurality of client devices. The method further includes assigning a pair of names for each of the media streams. The pair of names include a contribution name and a distribution name. The method further includes presenting a first list to the plurality of client devices. The first list includes a plurality of the distribution names for the media streams received from the plurality of client devices. The method further includes providing an indication of a current active speaker within the media streams via a signaling process.

The signaling process may include a piggybacking process that includes receiving, via the media bridge, a first request from a first client device for a first distribution name of an advertised active speaker and determining whether the first distribution name within the first request is assigned to the current active speaker. The method further includes transmitting to the first client device, via the media bridge, a negative-acknowledgement (NACK) message based at least in part on the first distribution name not being assigned to the current active speaker, and inserting an extension header in a data packet with a second distribution name assigned to the current active speaker. The method further includes receiving, via the media bridge, a second request from the first client device for the second distribution name assigned to the current active speaker. The method further includes transmitting a first media stream of the current active speaker to the first client device based at least in part on receiving the second request from the first client device for the second distribution name assigned to the current active speaker.

The method further includes sending to the first client device, via the media bridge, a notification of a change in the current active speaker, the notification including a third distribution name assigned to the current active speaker, and receiving, via the media bridge, a third request from the first client device for the third distribution name assigned to the current active speaker. The method further includes transmitting a second media stream of the current active speaker to the first client device based at least in part on receiving the third request from the first client device for the third distribution name assigned to the current active speaker.

Receiving the first request is performed based at least in part on a reception of the first distribution name from the media bridge during a connection establishment between the first client device and the media bridge. The method further includes adding a flag to a header of the data packet, the flag indicating the first distribution name of the advertised active speaker.

The signaling process may include a passive signaling process that includes publishing, via the media bridge, a first distribution name of the current active speaker based at least in part on a change in the current active speaker. The method further includes receiving from a first client device a request for the first distribution name assigned to the current active speaker. The request for the first distribution name may be received periodically. The method further includes transmitting to the first client device a first media stream associated with the current active speaker.

The contribution name defines a first indicator used by the media bridge to retrieve the media streams of the client devices. Stated another way, the contribution name is a naming used by the client device to publish a media stream to the media bridge and is used by the media bridge to retrieve the media stream from the client device. The distribution name defines a second indicator advertised to identify the client devices and is used by the media bridge to transmit a media stream of the first client device to other client devices. When seeking to transmit a media stream of a first client device to another client device, the media bridge performs a translation between the contribution name of the first client device to the distribution name of the client device to send out the media stream to other client devices within the RTC instance (e.g., videoconference). The media streams are received via a hybrid information-centric networking (hICN)-based, real-time communication (RTC) platform.

At least one client device of the plurality of client devices may simulcast to simultaneously stream a plurality of media streams at a corresponding plurality of qualities. The media bridge assigns one of the contribution names and one of the distribution names to each of the plurality of media streams simulcast by the at least one client device of the plurality of client devices at the corresponding plurality of qualities.

The signaling process includes, receiving, via the media bridge, a first request from a first client device for a first distribution name of a non-active speaker, and transmitting a first media stream of the non-active speaker to the first client device.

The method further includes receiving, via the media bridge, a first request from a first client device for a meeting manifest. The meeting manifest includes a first list of client devices among the plurality of client devices in a global meeting and a first plurality of distribution names associated with the first list of client devices, a list of groups included within the global meeting. The group manifest may include at least a second list of client devices included in each of the groups included in the list of groups and a second plurality of distribution names associated with the second list of client devices. The method further includes transmitting a first media stream of at least one of the client devices included in the first list of client devices to the first client device. At least one of the groups included within the list of groups may be a private group. The private group may be accessible using group encryption with each client device included within the second list of client devices encrypting its respective media stream via a group shared encryption key.

Examples described herein also provide a non-transitory computer-readable medium storing instructions that, when executed, causes a processor to perform operations, including at a media bridge configured to distribute media streams among a plurality of client devices connected to the media bridge over a network, receive a plurality of media streams from the plurality of client devices via the media bridge. The media bridge connecting the plurality of client devices. The operations may also include assigning a pair of names for each of the media streams. The pair of names include a contribution name and a distribution name. The operations may also include presenting a first list to the plurality of client devices. The first list including a plurality of the distribution names for the media streams received from the plurality of client devices. The operations may also include providing an indication of a current active speaker within the media streams via a signaling process.

The signaling process includes receiving, via the media bridge, a first request from a first client device for a first distribution name of an advertised active speaker and determining whether the first distribution name within the first request is assigned to the current active speaker. The signaling process further includes transmitting to the first client device, via the media bridge, a negative-acknowledgement (NACK) message based at least in part on the first distribution name not being assigned to the current active speaker, and inserting an extension header in a data packet with a second distribution name assigned to the current active speaker. The signaling process further includes receiving, via the media bridge, a second request from the first client device for the second distribution name assigned to the current active speaker, and transmitting a first media stream of the current active speaker to the first client device based at least in part on receiving the second request from the first client device for the second distribution name assigned to the current active speaker. The signaling process further includes sending to the first client device, via the media bridge, a notification of a change in the current active speaker. The notification includes a third distribution name assigned to the current active speaker. The signaling process further includes receiving, via the media bridge, a third request from the first client device for the third distribution name assigned to the current active speaker, and transmitting a second media stream of the current active speaker to the first client device based at least in part on receiving the third request from the first client device for the third distribution name assigned to the current active speaker.

Receiving the first request is performed based at least in part on a reception of the first distribution name from the media bridge during a connection establishment between a client device and the media bridge. The operations further include adding a flag to a header of the data packet, the flag indicating the first distribution name of the advertised active speaker.

The signaling process includes publishing, via the media bridge, a first distribution name of the current active speaker based at least in part on a change in the current active speaker, receiving from a first client device a request for the first distribution name assigned to the current active speaker, the request for the first distribution name being received periodically, and transmitting to the first client device a first media stream associated with the current active speaker.

The operations further include receiving, via the media bridge, a first request from a first client device for a meeting manifest. The meeting manifest includes a first list of client devices among the plurality of client devices in a global meeting and a first plurality of distribution names associated with the first list of client devices, a list of groups including within the global meeting, and a group manifest including at least a second list of client devices included in each of the groups included in the list of groups and a second plurality of distribution names associated with the second list of client devices. The operations further include transmitting a first media stream of at least one of the client devices included in the first list of client devices to the first client device. At least one of the groups included within the list of groups is a private group. The private group may be accessible using group encryption with each client device included within the second list of client devices encrypts its respective media stream via a group shared encryption key.

Examples described herein also provide a system includes a media bridge configured to distribute media streams among a plurality of client devices connected to the media bridge over a network. The media bridge receives a plurality of media streams from the plurality of client devices via the media bridge. The media bridge connects the plurality of client devices. The media bridge assigns a pair of names for each of the media streams. The pair of names include a contribution name and a distribution name. The media bridge presents a first list to the plurality of client devices. The first list includes a plurality of the distribution names for the media streams received from the plurality of client devices. The media bridge provides an indication of a current active speaker within the media streams via a signaling process.

The signaling process includes receiving, via the media bridge, a first request from a first client device for a first distribution name of an advertised active speaker and determining whether the first distribution name within the first request is assigned to the current active speaker. The signaling process further includes transmitting to the first client device, via the media bridge, a negative-acknowledgement (NACK) message based at least in part on the first distribution name not being assigned to the current active speaker. The signaling process further includes inserting an extension header in a data packet with a second distribution name assigned to the current active speaker. The signaling process further includes receiving, via the media bridge, a second request from the first client device for the second distribution name assigned to the current active speaker. The signaling process further includes transmitting a first media stream of the current active speaker to the first client device based at least in part on receiving the second request from the first client device for the second distribution name assigned to the current active speaker.

The signaling process includes publishing, via the media bridge, a first distribution name of the current active speaker based at least in part on a change in the current active speaker, receiving from a first client device a request for the first distribution name assigned to the current active speaker, the request for the first distribution name being received periodically, and transmitting to the first client device a first media stream associated with the current active speaker.

As used in the present specification and in the appended claims, the terms "bridge" or "media bridge" are meant to be understood broadly as any computer networking device that creates a single, aggregate network from multiple communication networks or network segments. Thus, the function of a media bridge may be referred to as network bridging. In contrast to "routing" where multiple networks communicate independently and yet remain separate, network bridging connects two separate networks as if they were a single network. In terms of the open systems interconnection (OSI) model model), bridging may be performed in the data link layer (e.g., layer 2). The examples of media bridges described herein may include, for example, a multiport bridge among other types of bridges. The media bridge may be any computing device that is operable with executable code associated with a real-time communication (RTC) system and is compatible with information-centric networking (ICN) and/or hybrid ICN network infrastructures.

As used in the present specification and in the appended claims, the term "information-centric networking (ICN)" is meant to be understood broadly as any network architecture in which the focus is information, content, or data identified within the network. Content within an ICN network is accessed by name and caching is universal in the network. ICN natively supports multi access processing and anycast, multicast, and broadcast group communication processing. In the examples of the hICN described herein, data may be independent from location, application, storage, and means of transportation, enabling in-network caching and replication. The hICN examples bring about improved efficiency and scalability with respect to information/bandwidth demand, and better robustness in challenging communication scenarios. Although hICN is described in the examples herein, the present systems and methods may be applied to ICN as well.

Additionally, the techniques described in this disclosure may be performed as a method and/or by a system having non-transitory computer-readable media storing computer-executable instructions that, when executed by one or more processors, performs the techniques described above.

Example Embodiments

Turning now to the figures, FIG. 1 illustrates a system-architecture diagram of a hybrid information-centric network (hICN)-based real-time communication (RTC) system 100, according to an example of the principles described herein. A hybrid information-centric network (hICN) may include any ICN network architecture that utilizes Internet protocol version 6 (IPv6) or Internet protocol version 4 (IPv4) to realize location-independent communications. An hICN network may include a network stack that implements ICN forwarding path in IPv6, and a transport stack that implements transport protocols to provide a reliable transport service implementation and a real-time transport service for audio and/or video media. In this manner, real-time communication (RTC) software may be executed on the hICN-based RTC system 100 to provide a plurality of client devices with the ability to communicate (e.g., exchange data packets) instantly or with negligible latency or transmission delays. The term "real-time" as used in the present description is synonymous with "live."

In one example, the RTC software utilized within and by the elements of the hICN-based RTC system 100 may include Web Real-Time Communication (WebRTC). WebRTC provides web browsers and mobile applications with RTC capabilities via simple application programming interfaces (APIs). Further, WebRTC allows for audio and video communication to be transmitted inside web pages by allowing direct peer-to-peer communication without a requirement for a plugins or native application to be downloaded and/or installed. Standards for WebRTC may be defined by the World Wide Web Consortium (W3C) and the Internet Engineering Task Force (IETF). In one example, the RTC software may include Webex® web conferencing and videoconferencing applications developed and distributed by Cisco Systems, Inc.

A media bridge 102 is included within the hICN-based RTC system 100. The media bridge 102 may include any suitable combination and arrangement of hardware and/or software, including any appropriate controlling logic, that can facilitate communication of information between multiple client devices 104-1, 104-2, 104-3, 104-4, . . . , 104-N (collectively referred to herein as client device(s) 104), where N is any integer greater than or equal to 1. Although five client devices 104 are depicted within the hICN-based RTC system 100 of FIG. 1, any number of client devices 104 may be communicatively coupled to the media bridge 102.

In one example, the media bridge 102 may include and/or be computationally supported by any number of computing devices. These supporting computing devices may be part of, include, and/or may be intermediary to the media bridge 102 and other devices such as the client devices 104. Therefore, the media bridge 102 may include and/or be computationally supported by computing devices such as, for example, a server computing device (e.g., a number of privately-host servers, a number of enterprise-hosted servers, a cloud network of servers, etc.), a gateway computing device, a network switch, a router, web services, and cloud computing services, among other types of computing devices.

A number of client devices 104 may communicatively couple to the media bridge 102. Each client device 104 may have installed thereon RTC services and associated hardware and software to allow the client devices 104 to generate and transmit data packets defining a media stream, an instant message, and other types of real-time communications. In one example, the client devices 104 may generate and transmit data packets defining video and/or audio for dissemination by the media bridge 102 as an instance of a video conference. Although the examples provided herein are described in the context of a videoconference, any type of RTC and associated forms of communication may be used in and benefit from the systems and methods described herein.

As depicted in FIG. 1, and only as an illustrative example, a client device 104-1 (also designated as C1 herein) and a fourth client device 104-4 (also designated as C4 herein) may be designated as active speakers (AS). In this example, client device 104-1 acts as a producer in generating content (e.g., a media stream sent from client device 104-1) to be made available via the media bridge 102. The media bridge 102 acts as a consumer with respect to the media stream from client device 104-1 and can distribute the media stream to other client devices (e.g., client devices 104-2, 104-3, . . . . 104-N). Similarly, the fourth client device 104-4 also acts as a producer in generating a media stream to be made available to other client devices 104 via the media bridge 102. Further, the client device 104-1 acts as a consumer of the media stream associated with the fourth client device 104-4 and sends a request to the media bridge 102 for media stream transmitted by the fourth client device 104-4. The media bridge 102 is also a consumer with respect to the media streams of both the client device 104-1 and the fourth client device 104-4, as well as all other client devices 104 participating within the videoconference. Thus, in this manner, all client devices 104 may request media streams and/or content from any client device 104. The second client device 104-2 also acts as a consumer and may request media streams from the client device 104-1 and/or the fourth client device 104-4 since the client device 104-1 and the fourth client device 104-4 are active speakers. Similarly, the third client device 104-3 acts as a consumer and may request media streams from the client device 104-1 and/or the fourth client device 104-4 since the client device 104-1 and the fourth client device 104-4 are active speakers. Thus, media streams from any active speaker within the videoconference may be requested by any participant within the videoconference. While any number of active speakers may be identified and included within the videoconference without limitation, the present systems and methods may limit the number of active speakers to, for example, five active speakers.

In identifying the client devices 104 within the videoconference and their respective media streams, a pair of names may be assigned to each of the client devices. The pair of names include a contribution name and a distribution name. Contribution naming is a naming used on the contribution path between the client device 104 producing and transmitting a media stream (acting as an hICN producer) and the requesting media bridge 102 (acting as an hICN consumer). The contribution name thus identifies media flows produced by a given client device 104 and is used by the media bridge 102 to retrieve the media streams from connecting client devices 104. The contribution name encoded into an hICN name may take the form of "/meeting_name/client_num/media_type/quality/pkt_num."

A distribution naming is a naming used on the distribution path between the client device 104 requesting a media stream (acting as an hICN consumer) and the media bridge 102 (acting as an hICN producer) for the media stream received by the client devices 104 recognized as active speakers. The distribution name identifies media flows produced by a given client device including, for example, a client device identified as an active speaker. Further, in one example, the distribution name of a connecting client device is advertised by the media bridge 102 to existing client devices 104 to identify the connecting client device 104. The media bridge 102 provides the distribution names of all the existing client devices 104 to any client device 104 attempting to connect to the media bridge 102 and the RTC instance (e.g., videoconference). A client device 104 attempting to connect to the media bridge 102 and the videoconference may be referred to as a connecting client device 104. The distribution name encoded into an hICN name may take the form of, for example, "/meeting_name/AS_num/media_type/quality/pkt_num."

Figure 2:
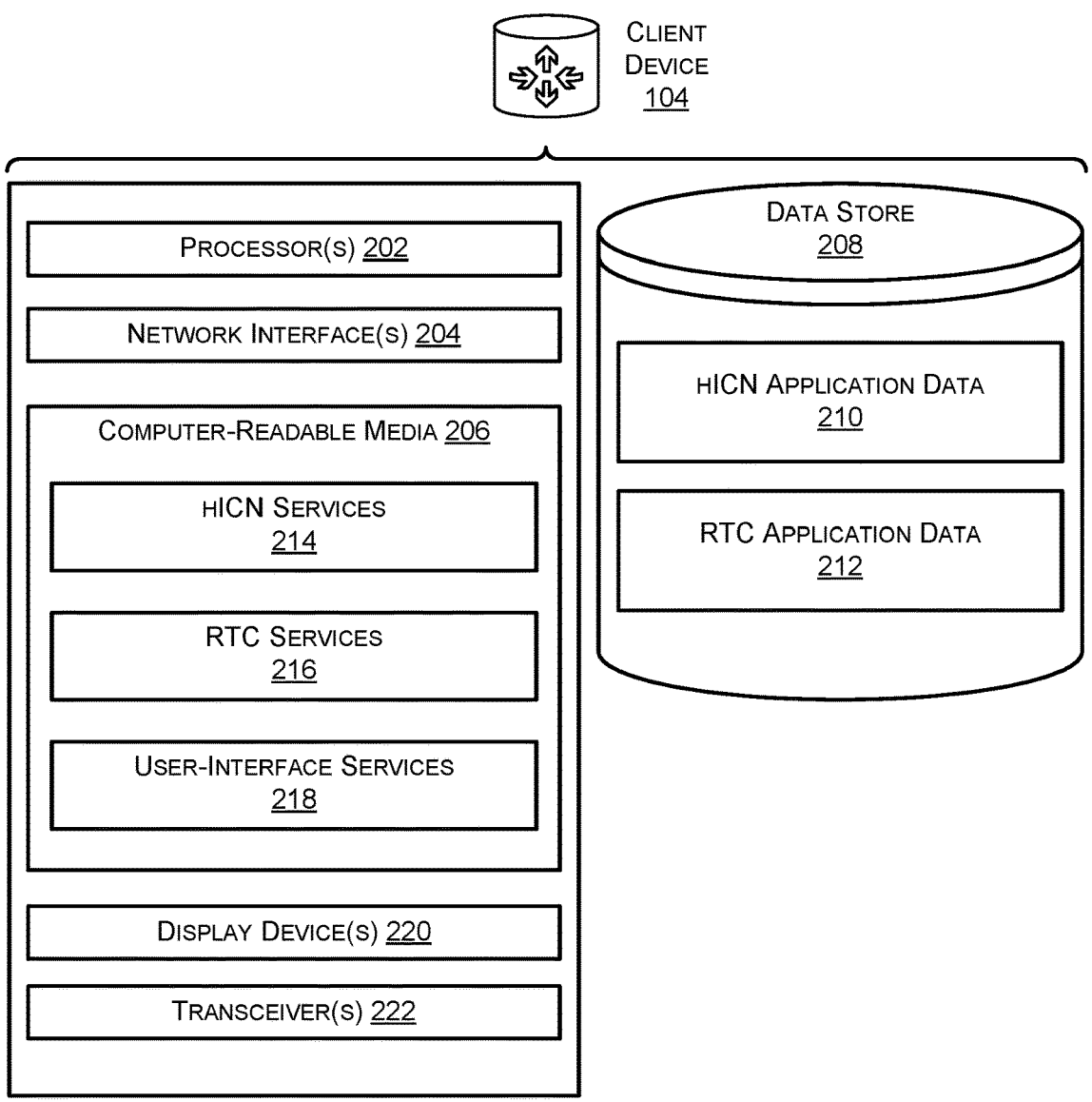
FIG. 2 is a component diagram of example components of a client device, according to an example of the principles described herein.

FIG. 2 is a component diagram 200 of example components of a client device 104, according to an example of the principles described herein. As illustrated, the client device 104 may include one or more processor(s) 202 configured to execute one or more stored instructions. The processor(s) 202 may comprise one or more cores. Further, the client device 104 may include one or more network interfaces 204 configured to provide communications between the client device 104 and other devices, such as devices associated with the system architecture of FIG. 1 including the media bridge 102, the other client devices 104, and/or other systems or devices associated with the client device 104 and/or remote from the client device 104. The network interfaces 204 may include devices configured to couple to personal area networks (PANs), wired and wireless local area networks (LANs), wired and wireless wide area networks (WANs), and so forth. For example, the network interfaces 204 may include devices compatible with the client devices 104, the media bridge 102, and/or other systems or devices associated with the client device 104.

The client device 104 may also include computer-readable media 206 that stores various executable components (e.g., software-based components, firmware-based components, etc.). In one example, the computer-readable media 206 may include, for example, working memory, random access memory (RAM), read only memory (ROM), and other forms of persistent, non-persistent, volatile, non-volatile, and other types of data storage. In addition to various components discussed herein, the computer-readable media 206 may further store components to implement functionality described herein. While not illustrated, the computer-readable media 206 may store one or more operating systems utilized to control the operation of the one or more devices that comprise the client device 104. According to one example, the operating system comprises the LINUX operating system. According to another example, the operating system(s) comprise the WINDOWS SERVER operating system from MICROSOFT Corporation of Redmond, Washington. According to further examples, the operating system(s) may comprise the UNIX operating system or one of its variants. It may be appreciated that other operating systems may also be utilized.

Additionally, the client device 104 may include a data store 208 which may comprise one, or multiple, repositories or other storage locations for persistently storing and managing collections of data such as databases, simple files, binary, and/or any other data. The data store 208 may include one or more storage locations that may be managed by one or more database management systems. The data store 208 may store, for example, hICN application data 210 defining computer-executable code utilized by the processor(s) 202 to execute the hICN services (e.g., applications) 214. Further, the hICN application data 210 may include data relating to user preferences associated with the hICN services 214, passwords, usernames, key/value data, and other data that may be used by the hICN services 214 to sign on to the services provided by the hICN services 214, and other data described herein that may assist in the hICN services and real-time communication processes described herein.

Further, the data store 208 may store RTC application data 212. The RTC application data 212 may include any data utilized by the client device 104 regarding the execution of the RTC services (e.g., applications) 216. This RTC application data 212 may include, for example, data relating to user preferences associated with the RTC services 216, passwords, usernames, key/value data, and other data that may be used by the RTC services 216 to sign on to the services provided by the RTC services 216, and other data described herein that may assist in the real-time communication processes described herein.

The computer-readable media 206 may store portions, or components, of hICN services 214. For instance, the hICN services 214 of the computer-readable media 206 may include any applications or computer-readable and/or computer executable medium that provide hICN services to the client device 104. The hICN services 214 may define an appropriate hICN naming and dynamic request scheme to address multimedia audio/video streams of active speakers in one or multiple qualities, dynamic change of active speakers, and dynamic change of user displayed layouts.

The computer-readable media 206 may store portions, or components, of RTC services 216. For instance, the RTC services 216 of the computer-readable media 206 may include any applications or computer-readable and/or computer executable medium that provide real-time communications services to the client device 104. The RTC services 216 may cause one or more real-time communications applications (e.g., WebRTC, Webex® online meeting service, the Jitsi RTC software, or other videoconferencing or RTC applications) to, when executed by the processor(s) 202 present a media stream created by the client devices 104 to the media bridge 102 for dissemination to other client devices 104. The RTC services 216 allow for the client devices 104 to communicate with other client devices 104 and with and via the media bridge 102.

The computer-readable media 206 may store portions, or components, of user interface services 218. The user interface services 218, when executed by the processor(s) 202 cause a UI to be displayed on a display device (s) 220 of the client device 104. In one example, the user interface services 218 cause the UI to be displayed on the display devices 220 and adjust the UI based on a current active speaker or a user-selected media stream from among those media streams transmitted by any other client device 104 participating within an RTC instance.

The client device 104 may also include a display device(s) 220. The display device(s) 220 may be provided to allow a user of a client device 104 to interact with and implement the functionality of the hICN services 214, the RTC services 216, the user interface services 218, and any other applications and services described herein. Examples of display devices 220 include a computer screen, a laptop screen, a mobile device screen, a personal digital assistant (PDA) screen, and a tablet screen, among other display devices 220.

The client device 104 may further include a transceiver 222. The transceiver 222 provides for communications with other data processing systems or devices such as, for example, the media bridge 102 and/or other client device(s) 104 communicatively coupled to the media bridge 102 and/or the client device 104. In one example, transceiver 222 includes one or more network interface cards. The transceiver 222 may provide communications through the use of either or both physical and wireless communications links.

Figure 3:
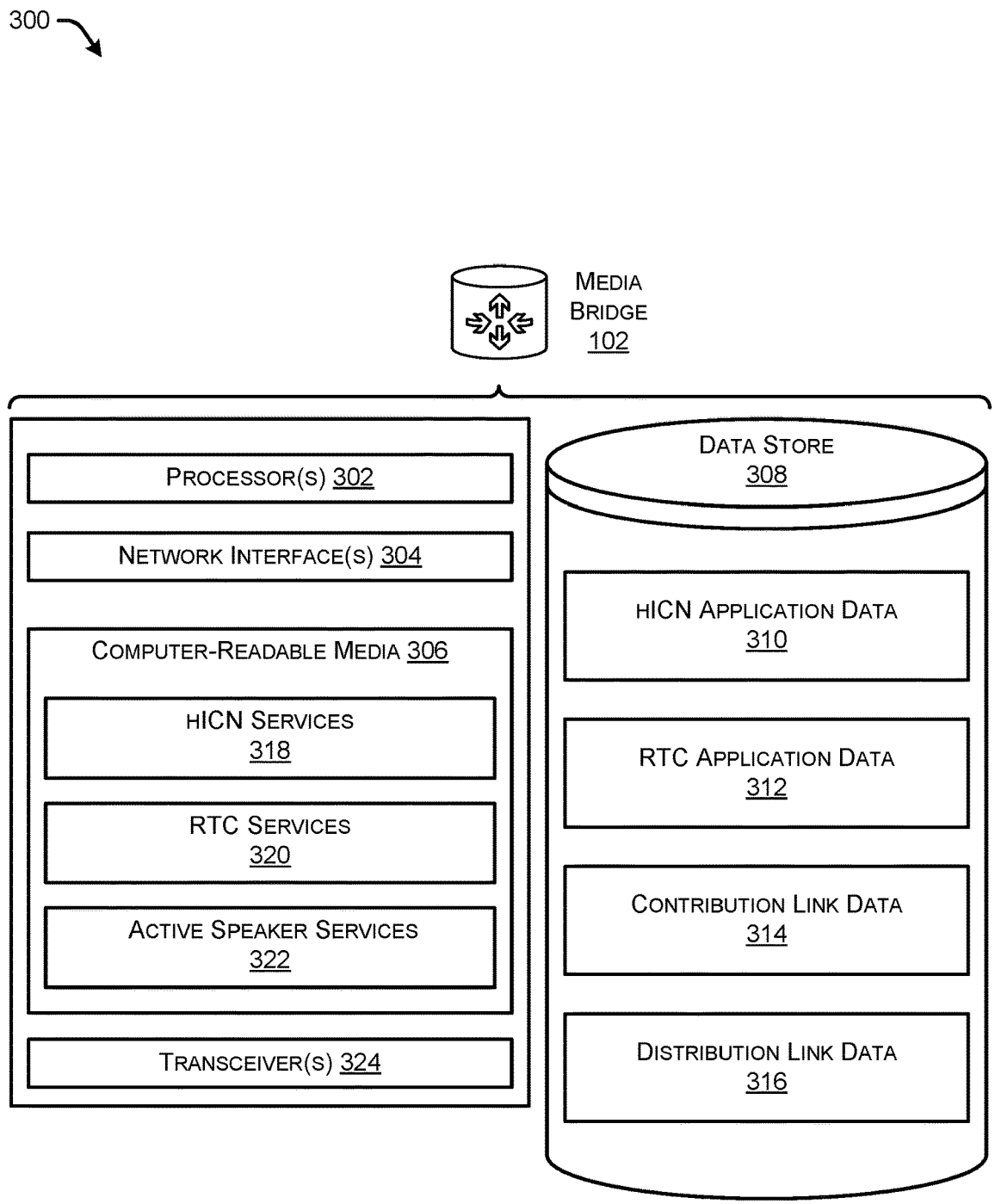
FIG. 3 is a component diagram of example components of a media bridge, according to an example of the principles described herein.

FIG. 3 is a component diagram 300 of example components of a media bridge 102, according to an example of the principles described herein. The media bridge is configured to distribute media streams among a plurality of client devices 104 connected to the media bridge 102 over a network, receiving a plurality of media streams from the plurality of client devices 104 via the media bridge 102. The media bridge 102 connects the plurality of client devices 104. As illustrated, the media bridge 102 may include one or more processor(s) 302 configured to execute one or more stored instructions. The processor(s) 302 may comprise one or more cores. Further, the media bridge 102 may include one or more network interfaces 304 configured to provide communications between the media bridge 102 and other devices, such as devices associated with the system architecture of FIG. 1 including the client devices 104, and/or other systems or devices associated with the client device 104 and/or remote from the client device 104. The network interfaces 304 may include devices configured to couple to personal area networks (PANs), wired and wireless local area networks (LANs), wired and wireless wide area networks (WANs), and so forth. For example, the network interfaces 304 may include devices compatible with the client devices 104, the media bridge 102, and/or other systems or devices associated with the media bridge 102 and/or the client device 104.

The client device 104 may also include computer-readable media 306 that stores various executable components (e.g., software-based components, firmware-based components, etc.). In one example, the computer-readable media 306 may include, for example, working memory, random access memory (RAM), read only memory (ROM), and other forms of persistent, non-persistent, volatile, non-volatile, and other types of data storage. In addition to various components discussed herein, the computer-readable media 306 may further store components to implement functionality described herein. While not illustrated, the computer-readable media 306 may store one or more operating systems utilized to control the operation of the one or more devices that comprise the client device 104. According to one example, the operating system comprises the LINUX operating system. According to another example, the operating system(s) comprise the WINDOWS SERVER operating system from MICROSOFT Corporation of Redmond. Washington. According to further examples, the operating system(s) may comprise the UNIX operating system or one of its variants. It may be appreciated that other operating systems may also be utilized.

Additionally, the media bridge 102 may include a data store 308 which may comprise one, or multiple, repositories or other storage locations for persistently storing and managing collections of data such as databases, simple files, binary, and/or any other data. The data store 308 may include one or more storage locations that may be managed by one or more database management systems. The data store 308 may store, for example, hICN application data 310 defining computer-executable code utilized by the processor(s) 302 to execute the hICN services (e.g., applications) 318. Further, the hICN application data 310 may include data relating to user preferences associated with the hICN services 318, passwords, usernames, key/value data, and other data that may be used by the hICN services 318 to sign on to the services provided by the hICN services 318, and other data described herein that may assist in the hICN services and real-time communication processes described herein.

Further, the data store 308 may store RTC application data 312. The RTC application data 312 may include any data utilized by the media bridge 102 regarding the execution of the RTC services (e.g., applications) 320. This RTC application data 312 may include, for example, data relating to user preferences associated with the RTC services 320, passwords, usernames, key/value data, and other data that may be used by the RTC services 320 to sign on to the services provided by the RTC services 320, and other data described herein that may assist in the real-time communication processes described herein.

The data store 308 may further store contribution link data 314. The contribution link data 314 defines data related to contribution names assigned to the client device 104 to which the media bridge 102 is coupled. A contribution name includes any naming used on the contribution path between the client device 104 producing and transmitting a media stream (acting as an hICN producer) and the requesting media bridge 102 (acting as an hICN consumer). The contribution name thus identifies media flows produced by a given client device 104 and is used by the media bridge 102 to retrieve the media streams from a connecting client device 104. A contribution link is a link used by the client devices 104 to send their respective media streams to the media bridge 102, and by which the media bridge 102, acting as a distribution sharer, sends the media streams to each client device 104.

The data store 308 may further store distribution link data 316. The distribution link data 316 defines the distribution path between the client device 104 requesting a media stream (acting as an hICN consumer) and the media bridge 102 (acting as an hICN producer) for the media stream received by the client devices 104 recognized as active speakers. The distribution name identifies media flows produced by a given active speaker. The distribution name is advertised by the media bridge 102 to existing client devices 104 to identify the connecting client device 104. The media bridge 102 provides the distribution names of all the existing client devices 104 to any client device 104 attempting to connect to the media bridge 102 and the videoconference. A client device 104 attempting to connect to the media bridge 102 and the videoconference may be referred to as a connecting client device 104.

The computer-readable media 306 may store portions, or components, of hICN services 318. For instance, the hICN services 318 of the computer-readable media 306 may include any applications or computer-readable and/or computer executable medium that provide hICN services to the media bridge 102 and/or the client devices 104. The hICN services 318 may define an appropriate hICN naming and dynamic request scheme to address multimedia audio/video streams of active speakers in one or multiple qualities, dynamic change of active speakers, and dynamic change of user displayed layouts.

The computer-readable media 306 may store portions, or components, of RTC services 320. For instance, the RTC services 320 of the computer-readable media 206 may include any applications or computer-readable and/or computer executable medium that provide real-time communications services to the media bridge 102. The RTC services 320 may cause one or more real-time communications applications (e.g., WebRTC, Webex® online meeting service, the Jitsi RTC software, or other videoconferencing or RTC applications) to, when executed by the processor(s) 302 to allow the media bridge 102 to present a media stream created by the client devices 104 for dissemination to the client devices 104 communicatively coupled to the media bridge 102. The RTC services 320 allow for the client devices 104 to communicate with other client devices 104 and with and via the media bridge 102.

The computer-readable media 306 may store portions, or components, of active speaker services 322. The active speaker services 322, when executed by the processor(s) 302 cause the media bridge 102 to provide a media stream of an active or non-active speaker within the RTC to one or more of the client devices 104 and as requested by the client devices 104. In one example, the active speaker services 322 cause a connecting client device 104 to receive a number of lists of participating client devices 104 within the RTC instance. The number of lists of participating client devices 104 may include a list of a known active speaker ranking, a current active speaker ranking, a list indicating a change in active speaker, and a current active speaker ranking, among other lists and rankings described herein. Using these lists, the media bridge 102 may identify an active speaker or non-active speaker, and transmit media streams thereof to a client device 104 as requested by the client device 104.

In the examples described herein, the active speaker ranking may be determined based on any ranking system or method. For example, the active speaker ranking may be determined based on a most recent speaker parameter where the client device 104 through which a user was most recently speaking is the active speaker. Other rankings may be utilized in the present systems and methods. In one example of a ranking method, one or more of the client devices 104 may be precluded from being an active speaker as determined by, for example, a manager of the RTC instance.

The media bridge 102 may further include a number of transceiver(s) 324. The transceiver(s) 324 provides for communications with other data processing systems or devices such as, for example, the client device(s) 104 communicatively coupled to the media bridge 102 and/or other computing devices described herein. In one example, transceiver(s) 324 includes one or more network interface cards. The transceiver(s) 324 may provide communications through the use of either or both physical and wireless communications links.

Piggyback Signaling of the Active Speaker

Figure 4:
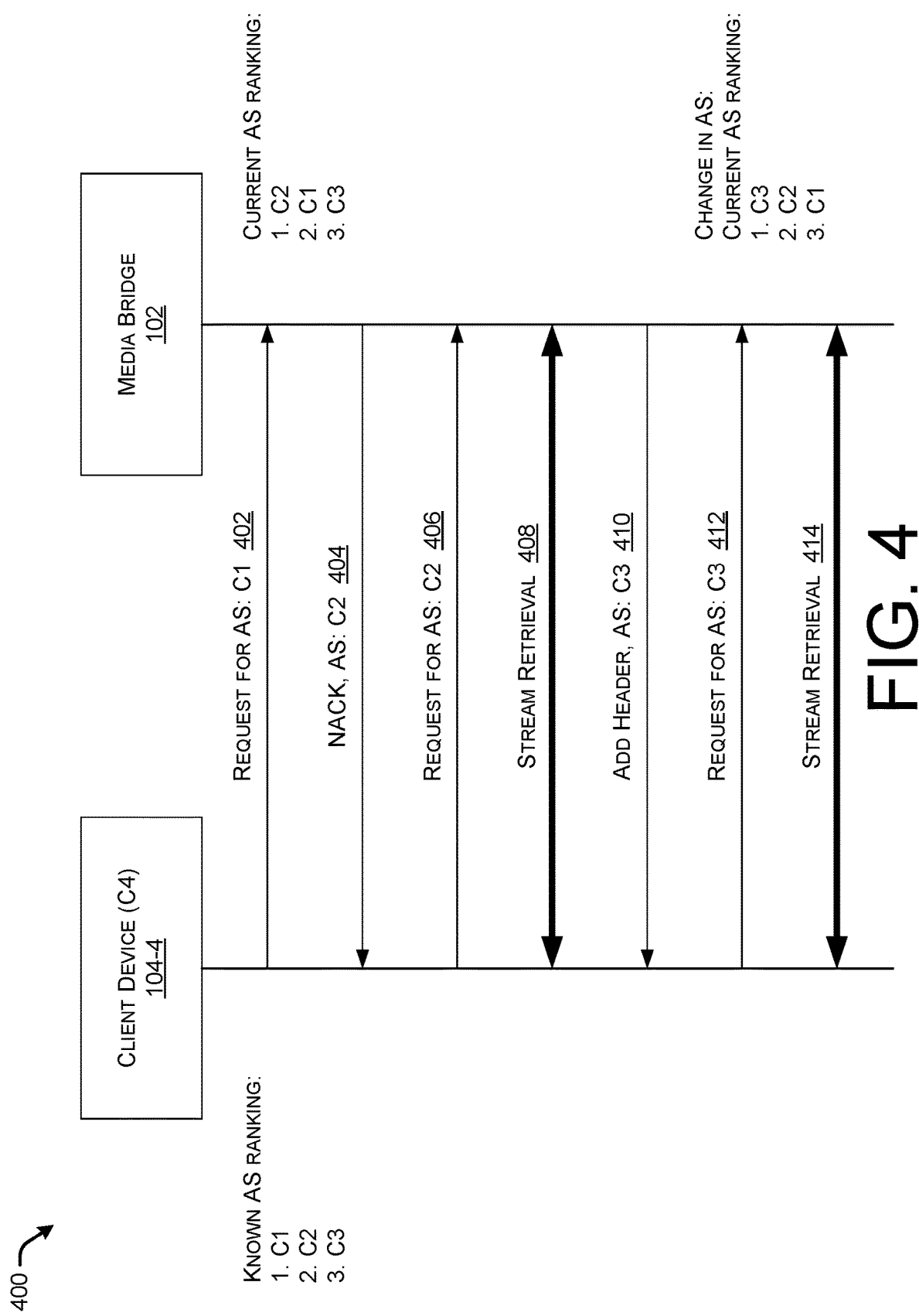
FIG. 4 illustrates a call flow diagram of a number of client devices communicating via the hICN network of FIG. 1 in a piggybacking method of identifying an active speaker, according to an example of the principles described herein.

Having described the hICN-based RTC system depicted in FIG. 1, the client devices 104, and the media bridge 102, the process by which a media stream of an active speaker may be provided to a client device 104 is now described in connection with FIGS. 4 and 5. FIG. 4 illustrates a call flow diagram 400 of a number of client devices 104 communicating via the network of the hICN-based RTC system 100 of FIG. 1 in a piggybacking method of identifying an active speaker, according to an example of the principles described herein. The media bridge 102 functions, in part, as an active speaker tracking device and an active speaker signaling device. The media bridge 102 may be aware of a current list of active speakers. In one example, there is only one active speaker at a given time during, for example, a videoconference or RTC instance. In one example, the client devices 104 may transmit their respective media streams (e.g., audio and video (A/V)) to the media bridge 102. The media bridge 102 may identify and transmit the media stream of an active speaker to the client devices 104 identified as not being the active speaker. However, as described in more detail herein, any client device 104 may request the media bridge 102 to send any media stream to that client device 104. Because the hICN-based RTC system described herein is name-based, rather than pushing everything to the media bridge 102, the application layer is unchanged and instead, the transport layer, which is named-based for hICN, is used to recognize the active speaker among the client devices 104, and other client devices request the media content for active speaker. This can become complex because the active speaker is not static as users of the client devices 104 that are participating in the RTC instance may each take turns speaking. A client device 104, as a user, may request the media bridge 102 to provide a particular active speaker using the contribution name and the distribution name of the client device 104 identified as the active speaker. The term media stream, as used herein, is meant to include audio, video, and other digital content that may be shared or presented during an RTC instance (e.g., a videoconference). In the drawings, the term "AS" refers to "active speaker." Further, in the drawings, C1, C2, and C3 refer to client device 104-1, client device 104-2, and client device 104-3, respectively.

The call flow diagram 400 depicts an instance wherein a connecting client device, client device 104-4, is connecting to the media bridge 102 in order to begin participation in the RTC instance along with a number of other client devices 104. The media bridge 102 stores in, for example, the data store 308, a list of "known AS rankings" that defines a list of client devices 104 and which of the client devices 104 is the active speaker based on a ranking algorithm. The media bridge 102 may identify and rank of active speakers over time. Any algorithms may be used to rank the client devices 104 to obtain the active speaker ranking such as, for example, the most recent client device 104 via which ha user is speaking as the top ranking active speaker, and subsequent most recent active speakers being ranked based on how recent they were active speakers. However, any algorithms may be used to determine the ranking of the client devices 104 as active speakers.

For any client device 104 participating in the RTC instance, the media bridge 102 provides a list of distribution names of the client devices 104 participating in the RTC instance. Thus, as client device 104-4 begins communication within the RTC instance via the media bridge 102, the media bridge 102 provides the list of distribution names of the client devices 104 participating in the RTC instance and the list of "known AS rankings." The client device 104-4 may store this data received from the media bridge 102 within, for example, the data store 208 as hICN application data 210 and/or RTC application data 212. With the data obtained from the media bridge 102, the client device 104-4 knows the media streams of the other client devices 104 are available and also knows their respective distribution names. The process of FIG. 4 provides a "piggybacking" signaling process to provide and track an active speaker within the RTC instance. To do this, the client device 104-4, acting as a connecting client device and having received the list of distribution names of the client devices 104 participating in the RTC instance and the list of "known AS rankings," sends, at 402, a request to the media bridge 102 for the active speaker (AS) identified in the "known AS rankings" the client device 104-4 received upon connecting to the RTC instance and the media bridge 102. In the example of FIG. 4, the AS at the time client device 104-4 connected was determined to be client device 104-1 (referred to as C1). When the client device 104-4 requests the media stream of the active speaker, the client device 104-4 sends an interest for the advertised active speaker distribution name he received from the media bridge 102 when the client device 104-4 connected. Within this interest request, the client device 104, through execution of the computer-readable media 206, adds an AS flag to the header of the interest request. The AS flag may include any extension to the header of the data packet, or may be included as an extension within the payload of the data packet sent by the client device 104-4 to the media bridge 102. Thus, at 402, the media bridge 102 receives a first request from the client device 104-4 for a first distribution name of an advertised active speaker presented in the list of "known AS rankings."

The media bridge 102 determines whether the distribution name within this first request from the client device 104-4 is assigned to the current active speaker. In instances where, for example, client device 104-1 (C1) is the active speaker, the media bridge 102 will retrieve the media stream of client device 104-1 using the contribution name of client device 104-1, and provide that media stream to client device 104-4 using the distribution name of client device 104-4.

In one example of the method at 402, client device 104-4 may include a request for the media stream of any of the client devices 104 irrespective of the "known AS rankings." For example, client device 104-4 may request the media stream of client device 104-2 (C2) or client device 104-3 (C3) despite the indication in the "known AS rankings" that client device 104-1 (C1) is the AS. Stated another way, the client device 104-4 may include an AS flag within the header of the interest request that indicates any of the client devices 104 other than itself and/or the distribution name of that requested client device 104. In this manner, the "known AS rankings" may simply include the list of distribution names of the client devices 104 participating in the RTC instance in any order with the assumption that if the distribution name of a non-active speaker is included in the request at 402, the media bridge 102 will provide the client device 104-4 with the current active speaker as described below.

However, for the sake of explanation, the example of FIG. 4 indicates that client device 104-1 (C1) is no longer the active speaker as designated by a "current AS ranking" list, and that client device 104-2 (C2) has since been identified as the AS after client device 104-4 connected to the media bridge 102. Thus, in this instance where the "current AS ranking" list indicates an AS different from the "known AS rankings" list, the method further includes, at 404, transmitting to client device 104-4, via the media bridge 102, a negative-acknowledgement (NACK) message based at least in part on the distribution name within the request at 402 not being assigned to the current active speaker. At 404, the media bridge 102 inserts an extension header in the data packet sent to client device 104-4 in response to the request at 402. The extension to the header of the data packet sent by the media bridge 102 to the client device 104-4 may be an extension to the header of the data packet or may be included within the payload of the data packet sent to the client device 104-4. The extension header includes a second distribution name assigned to the current active speaker; in this case, client device 104-2 (C2) since, again, in the example of FIG. 4, client device 104-2 (C2) is identified as the current AS based on the "current AS ranking" list.

When the client device 104-4 receives the NACK message, the client device 104-4 knows that the AS is client device 104-2 (C2). At 406, the method further includes receiving, via the media bridge 102, a second request from client device 104-4 for the second distribution name assigned to the current active speaker; in this case, client device 104-2 (C2). The call flow diagram 400 further includes, at 408, transmitting a media stream of the current active speaker to client device 104-4 based at least in part on receiving the second request from client device 104-4 for the distribution name assigned to the current active speaker (e.g., client device 104-2 (C2)). The media bridge 102 provides the media stream of the current active speaker (e.g., client device 104-2 (C2)) by obtaining the distribution name of client device 104-2 from the request from client device 104-4 at 406, translating the distribution name of client device 104-2 to the contribution name of client device 104-2, obtaining the media stream of client device 104-2, and streaming the media stream of client device 104-2 to client device 104-4. In one example, the user interface services 218 of the client device 104-4 may cause the media stream of client device 104-2 to be displayed in a prominent or relatively more prominent position within a UI displayed on the display device 220 than otherwise presented such that such prominent display indicates that the media stream of client device 104-2 is a media stream of an active speaker. In one example, prominent display of the media stream of the active speaker may include the isolated display of the media stream of the active speaker without other media streams from other client devices being displayed on the UI.

As regularly occurs, the active speaker within an RTC instance (e.g., a videoconference) may change. In fact, the active speaker may change very often throughout the RTC instance. In the example of FIG. 4, the active speaker changes from client device 104-2 (C2) to client device 104-3 (C3). In this situation, the call flow diagram 400 may further include, at 410, sending to the client device 104-4 from the media bridge 102, a notification of a change in the current active speaker. The notification may include a new list of "current AS ranking." and in the example of FIG. 4 it is indicated that client device 104-3 (C3) is the new active speaker. Further, the notification may include an addition to a header of the message sent at 410 that includes another AS flag indicating that client device 104-3 is the active speaker in a similar manner as performed at 404. Thus, the notification from the media bridge 102 includes a distribution name assigned to the current active speaker.

In order to allow the client device 104-4 to obtain the media stream of the client device 104-3 (C3) indicted as being the new active speaker in the new list of "current AS ranking" received from the media bridge 102, the client device 104-4 may send a third request to the media bridge 102 for the distribution name assigned to the current active speaker (e.g., client device 104-3 (C3)) as indicated at 412.

The call flow diagram 400 may include, at 414, transmitting a second media stream of the current active speaker (e.g., client device 104-3 (C3)) to the client device 104-4 based at least in part on receiving the third request from the client device 104-4 for the distribution name assigned to the current active speaker (e.g., client device 104-3 (C3)).

In one example, receiving the first request at 402 by client device 104-4 is performed based at least in part on a reception of the distribution name of the AS as indicated in the "known AS ranking" from the media bridge 102 during a connection establishment between the client device 104-4 and the media bridge 102. Receiving the second request at 406 by client device 104-4 is performed based at least in part on a reception of the distribution name of the AS as indicated in the "current AS ranking" by the media bridge 102 during and/or after a connection establishment between the client device 104-4 and the media bridge 102 assuming the "known AS ranking" and the "current AS ranking" do not indicate the same AS in their respective rankings. This indicates that the AS has changed since the outset of the RTC instance and/or the connection of the client device 104-4 to the media bridge 102. Receiving the third request at 412 by client device 104-4 is performed based at least in part on a reception of the distribution name of the AS as indicated in an updated "current AS ranking" from the media bridge 102. In all of these instances, the method further includes adding an AS flag to a header of the data packet transmitted by the media bridge 102. The AS flag indicates the distribution name of the active speaker as indicated in the "known AS ranking," the "current AS ranking," and an updated "current AS ranking," respectively.

Passive Signaling of the Active Speaker

Having described a piggy backing method of identifying an active speaker in FIG. 4, a passive method of identifying an active speaker will now be described in connection with FIG. 5. FIG. 5 illustrates a call flow diagram 500 of a number of client devices 104 communicating via the network of the hICN-based RTC system 100 of FIG. 1 in a passive signaling method of identifying an active speaker, according to an example of the principles described herein.

In the passive signaling method, the media bridge 102 may publishing a distribution name of the current active speaker based at least in part on a change in the current active speaker. In instances where client device 104-4 (C4) is establishing a connection with the media bridge 102, the change in the current active speaker may be realized as a distribution name of the current active speaker found in the "current AS ranking" list published by the media bridge 102 and/or provided to the client device 104-4 upon connection. In the example of FIG. 5, the current active speaker is designated as client device 104-2 (C2), and the media bridge 102, at 504, provides the media stream of client device 104-2 (C2) to client device 104-4. Thus, the call flow diagram 500 may include receiving from the client device 104-4 a request for the distribution name assigned to the current active speaker at 502.

The request for the distribution name assigned to the current active speaker may be sent periodically by a client device 104 (client device 104-4 in the example of FIG. 5) at, for example, between every 100 milliseconds (ms) and 300 ms. The request for the distribution name assigned to the current active speaker may be sent periodically by a client device 104 (client device 104-4 in the example of FIG. 5) at, for example, every 200 ms. In other words, the media bridge 102 may publish the "current AS ranking" list and the client device 104 seeking to obtain the media stream of the current active speaker may periodically request for the "current AS ranking" list. Therefore, the client devices 104 including the client device 104-4 know the distribution name associated to the current active speaker. Within this call flow diagram 500, the media bridge 102 is not required to indicate the current active speaker to the client devices 104 which may reduce computing processing time within the overall systems and methods.

The call flow diagram 500 may also include, as mentioned above, transmitting to the client device 104-4 the media stream associated with the current active speaker at 504 based on the request from the client device 104-4 at 502.

The media bridge 102 publishes the distribution name of the current active speaker whenever there is a change of active speaker among the participating client devices 104. As regularly occurs, the active speaker within an RTC instance (e.g., a videoconference) may change. In fact, the active speaker may change very often throughout the RTC instance. In the example of FIG. 5, the active speaker changes from client device 104-2 (C2) to client device 104-3 (C3). In this situation, the call flow diagram 500 may further include, with the media bridge 102, publishing a "current AS ranking" list in response to the active speaker changing such as between 504 and 506 of FIG. 5. The client device 104-4 may periodically send a request for the "current AS ranking" list and obtain an updated or new "current AS ranking" after the media bridge 102 publishes the new or updated "current AS ranking" list in response to the active speaker changing. Thus, the call flow diagram 500 may also include transmitting to the client device 104-4 the media stream associated with the new or updated current active speaker at 506 (e.g., client device 104-3 (C3) in the example of FIG. 5) based on the request from the client device 104-4 at 502.

Figure 5:
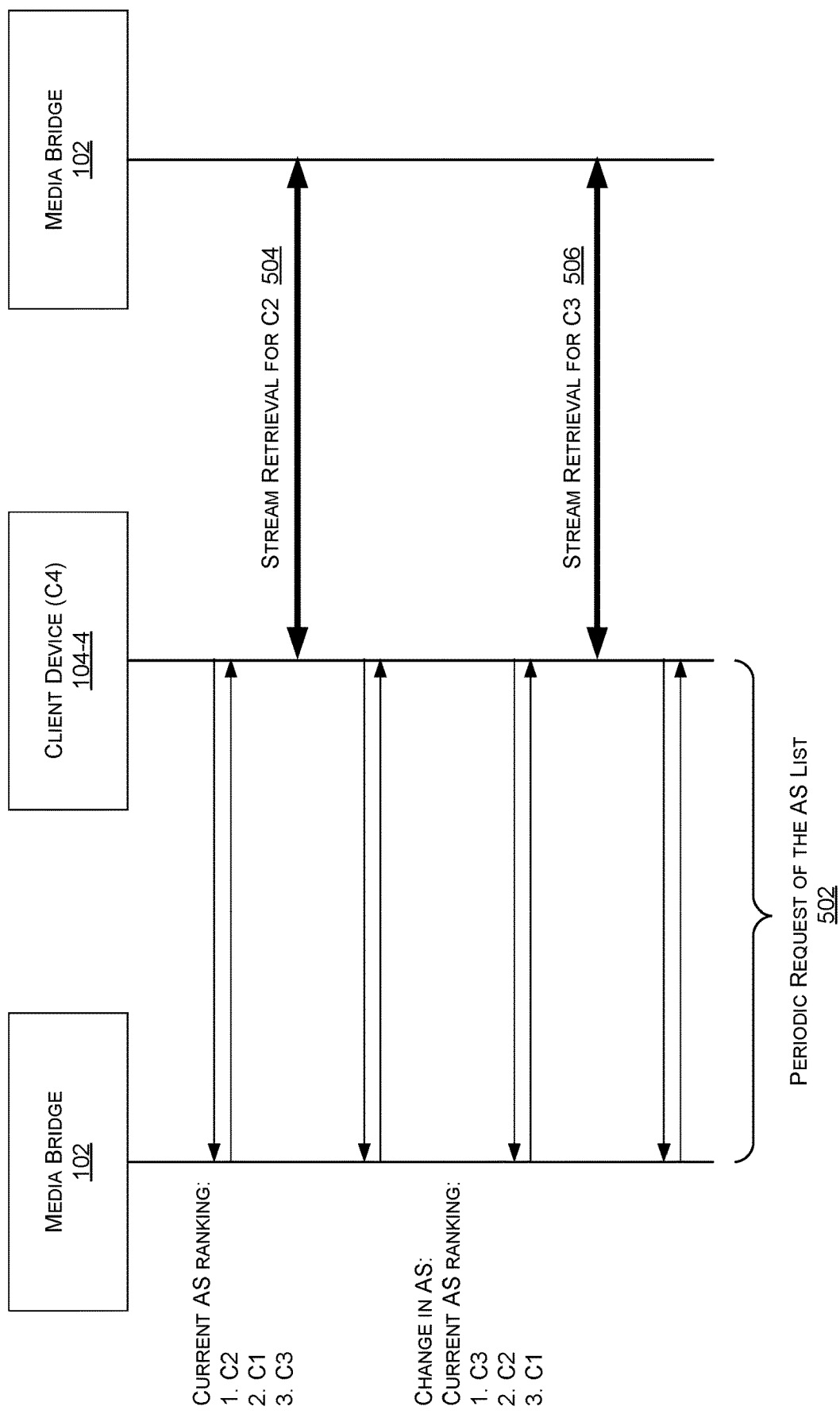
FIG. 5 illustrates a call flow diagram of a number of client devices communicating via the hICN network of FIG. 1 in a passive signaling method of identifying an active speaker, according to an example of the principles described herein.

In FIG. 5, it is noted that the "current AS ranking" list and any updates thereto are common to all client devices 104 participating within the RTC instance (e.g., the videoconference). In this manner, all client devices 104 have knowledge of the same active speaker such that the active speaker identified in the "current AS ranking" list can be distributed using a name known by all client devices 104 including at the time each client device 104 joins the RTC instance. In this manner, the multicast features of hICN of minimizing the cost of the signaling at the server side may be utilized for the benefit of the overall systems and methods. In fact, a server computer or similar supporting computing device may produce a single data packet at any instance of a change in the active speaker, while the hICN-based RTC system 100 may take care to distribute it to all the client devices 104.

In the examples of both FIGS. 4 and 5, since the active speaker flows are distributed using the same name of the client devices 104, there is no possibility of duplication of the active speaker flows (e.g., the media streams from the client devices 104). This reduces computing resource costs in terms of bandwidth and processing at the media bridge 102 and/or any computing devices serving as computational support for the media bridge 102 such as, for example, a server computing device (e.g., a number of privately-host servers, a number of enterprise-hosted servers, a cloud network of servers, etc.), a gateway computing device, a network switch, a router, web services, and cloud computing services, among other types of computing devices.

With regard to latency within the systems described herein, the piggy backing processes described above does not induce any noticeable increase of latency around an active speaker switch of a client device 104 with respect to Webex®, WebRTC, the Jitsi RTC software, or other video-conferencing or RTC applications, and as tested thereby.

The passive processes described above may introduce some latency as the current active speaker distribution name is retrieved periodically. The maximum added latency within the passive processes is period+2*round-trip time (RTT). However, any latency induced by the passive processes may be mitigated by selecting a period that is low enough. It is noted that a delay of up to 1 second between the change of active speaker event (detection of a new active speaker at the media bridge 102) and the reception of the associated new media stream may be tolerable.

User Interface Layout Customization

As mentioned above, the user interface services 218 of the client devices 104 may be executed by the processor(s) 202 may cause a UI to be displayed on the display device 220 including any media streams produced via the present systems and methods. Further, the present systems and methods may cause the client devices 104 to select any media stream produced by any other client device 104 as determined by a user of the client device. This selection of any media stream produced by any other client device 104 may include the media stream of the active speaker or the media stream of another particular client device 104 including any client device 104 identified as a non-active speaker or as not being the active speaker.

The methods described herein may include, at the media bridge 102, receiving a plurality of media streams from the plurality of client devices 104 via the media bridge 102, and assigning a pair of names for each of the media streams. The pair of names include the contribution name and the distribution name. The method further includes presenting a first list to the plurality of client devices 104 where the first list includes a plurality of the distribution names for the media streams received from the plurality of client devices 104, and providing an indication of a current active speaker within the media streams via a signaling process. In an example where a user of a client device seeks to obtain a media stream produced by a client device 104 not listed as an active speaker (e.g., a non-active speaker), the client device 104 may send and the media bridge 102 may receive first request for the distribution name of the client device 104 that is a non-active speaker. In one example, the requesting client device 104 may include an AS flag within the header of the request that indicates the requested client device 104. The media bridge 102 may transmit the media stream of the non-active speaker of the requested client device 104 to the client device 104 that made the request. In instances where the client device 104 requests a non-active speaker flow, the AS flag may not be included within the header of the request.

Distribution Name Propagation Protocols

As mentioned above, the distribution name of each client device 104 may be shared within the hICN-based RTC system 100. In order to provide an up-to-date list of all the distribution names associated with the available media streams of the client devices 104, the media bridge 102 may notify the client devices 104 when a change in participation in the RTC instance occurs. These changes in participation may include instances when a client device 104 joins the RTC instance, leaves the RTC instance, begins to share content, and stops sharing content, among other types of changes in participation.

In the active signaling method described above, the media bridge 102 notifies the client devices 104 of a change in a list of client devices 104 whenever a change occurs. In this example, the media bridge 102 may trigger the pull of the new participation list when required, and may be performed without any additional messages from the media bridge 102. The media bridge 102 may add a field in the active speaker list that describes whether there is a modification in the list of the distribution names, and the client devices 104 may pull the new, updated, modified, or a different list that includes the changes identified by the media bridge 102.

In the passive signaling method described above, the media bridge 102 may keep a manifest of all the available media streams and associated client devices 104. The client devices 104 may periodically request this manifest. Thus, when utilizing the passive signaling method, this can be coupled with the passive signaling described above for the active speaker tracking by tagging, either implicitly (e.g., placing the client device 104 that is the active speaker at the top of the manifest), or explicitly, the distribution names of the client device 104 of the current active speaker.

In-Meeting Group Management

In WebRTC, the WebEx® online meeting service, and the Jitsi RTC software, among other online RTC services, the client devices 104 participating within an RTC instance may create a group within the RTC instance that allows the users of those client devices 104 within the group to communicate while still participating in the main or global meeting the includes all client devices 104. For example, in a videoconference, a keynote speaker may be presenting in a global meeting. A plurality of users of a plurality of the client devices 104 may desire to speak with one another while still being able to listen to the keynote speaker as the active speaker in the global meeting. In another example, in a virtual classroom split into different student groups, a student operating a client device 104 may desire to follow the work in his group while still being able to listen to the teacher who may be presenting as an active speaker through their client device 104 via the main meeting. To allow for groups to participate in both a group setting and the main meeting, the present systems and methods may utilize the names propagation protocol presented above as described below.

In these examples, the client devices 104 may request periodically a meeting manifest. The meeting manifest may include a list of client devices 104 participating in the global meeting including client devices 104 participating within any group and client devices 104 not participating within any group and their respective distribution names. The meeting manifest may also include a list of groups within the RTC instance and a group manifest for each of the groups. A group manifest includes a list of client devices 104 participating in the group meeting and their respective distribution names.

As mentioned above, the group manifest is a list of client devices 104 participating in a group and their associated distribution names. Each group may utilize the piggybacking signaling processes and/or the passive signaling processes described above to track the current active speaker. In this manner, each group may function as an RTC instance in and of itself. In one example, a client device 104 participating in the global meeting may be allowed to listen and/or view activity within the different groups and may be provided a media stream of at least one of the client devices 104 participating the groups. Further, a client device 104 participating in a group may have access to and may be allowed to listen and/or view active within the global meeting. When a client device 104 joins a group, that client device 104 retains the contribution name and distribution name assigned it by the media bridge 102 when that client device 104 first joined the RTC instance including the global meeting.

Further, in one example, a group within the RTC instance may include a private group. A private group may include a group that is accessible for a subset of client devices 104. A private group may be created using group encryption where each client device 104 participating in the private group encrypts its respective media stream with a group shared key. The shared key may be distributed among the client devices 104 participating in the private group, and the shared key may be updated when a participant joins and/or leaves the private group. In this example, any key management process such as, for example, messaging layer security (MLS) may be utilized. In one example, the distribution names of client devices 104 participating in the private group may be changed to provide added security within the private group when the client devices 104 join a private group. This avoids client devices 104 not authorized in the private group to still be able to request the content (e.g., media stream(s)) of the private group.

Simulcasting

In one example, the present systems and methods may utilize simulcasting. Simulcasting is the ability for a client device 104 to simultaneously send a media stream over multiple qualities. In this example, the media bridge 102 may assign a pair of network names (e.g., a contribution name and a distribution name) per quality of media stream. Thus, client device 104-4 may simulcast its media stream in a first quality and a second quality. In this example, a first contribution name and a first distribution name may be assigned by the media bridge 102 for the first quality of the media stream. Similarly, a second contribution name and a second distribution name may be assigned by the media bridge 102 for the second quality of the media stream. Each quality of media stream with their respective assigned contribution names and distribution names may be subjected to the piggy backing signaling processes and/or the passive signaling processes described above to track the current active speaker.

Piggyback Signaling Method of the Active Speaker

Figure 6:
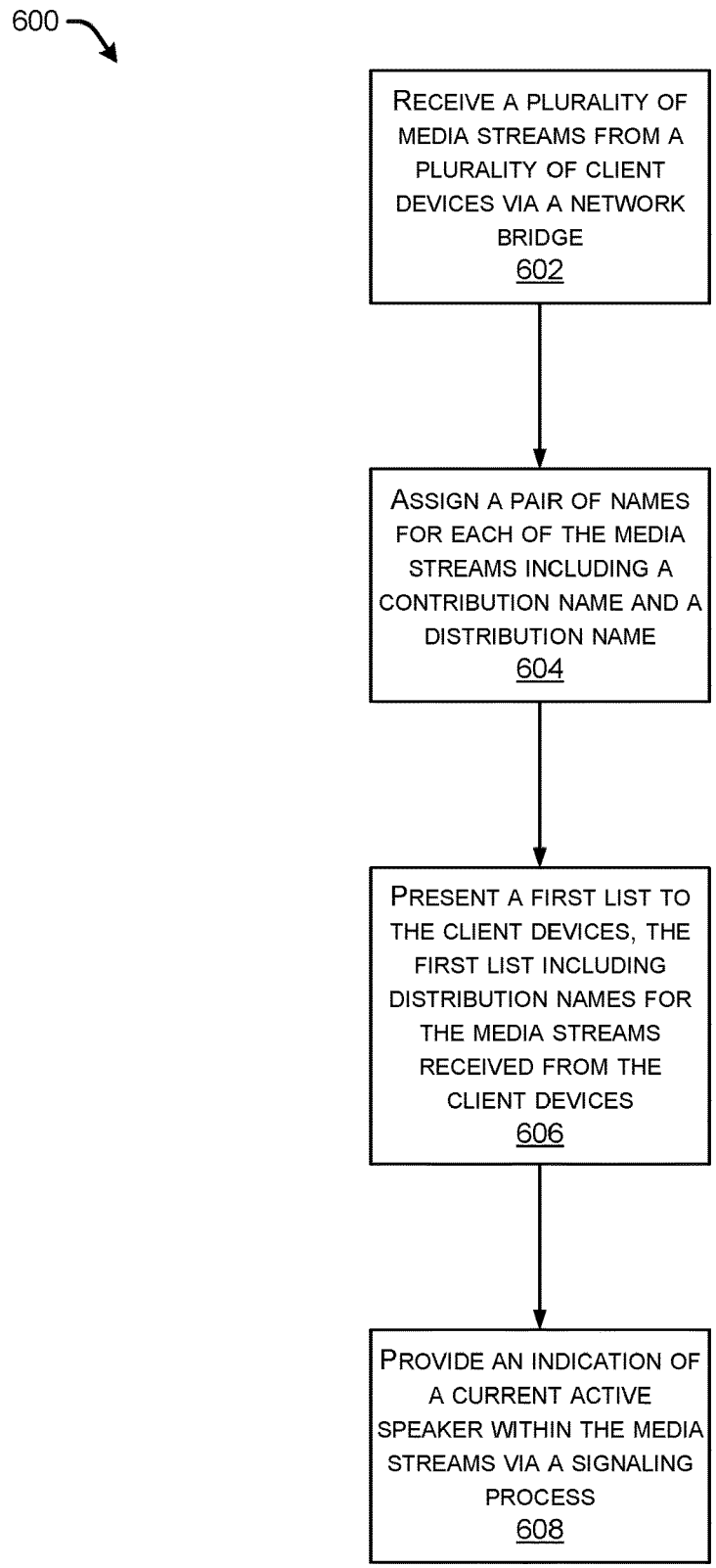
FIG. 6 illustrates a method of identifying an active speaker, according to an example of the principles described herein.

Having described the systems and call flows associated with the piggy back signaling and passive signaling of the active speaker, an overall method associated therewith will now be described in connection with FIGS. 1 through 5. FIG. 6 illustrates a method 600 of identifying an active speaker, according to an example of the principles described herein. The method 600 of FIG. 6 includes, at a media bridge 102 configured to distribute media streams among a plurality of client devices 104 connected to the media bridge 102 over a network of the hICN-based RTC system 100, receiving, at 602, a plurality of media streams from the plurality of client devices 104 via the media bridge 102. The media bridge 102 connects the plurality of client devices 104. The method further includes, at 604, assigning a pair of names for each of the media streams. The pair of names include a contribution name and a distribution name as described herein. The method further includes, at 606, presenting a first list to the plurality of client devices 104. The first list includes a plurality of the distribution names for the media streams received from the plurality of client devices 104. At 608, the method further includes providing an indication of a current active speaker within the media streams via a signaling process. As described herein, the signaling process may include the piggy back signaling and passive signaling of the active speaker as described herein.

Figure 7:
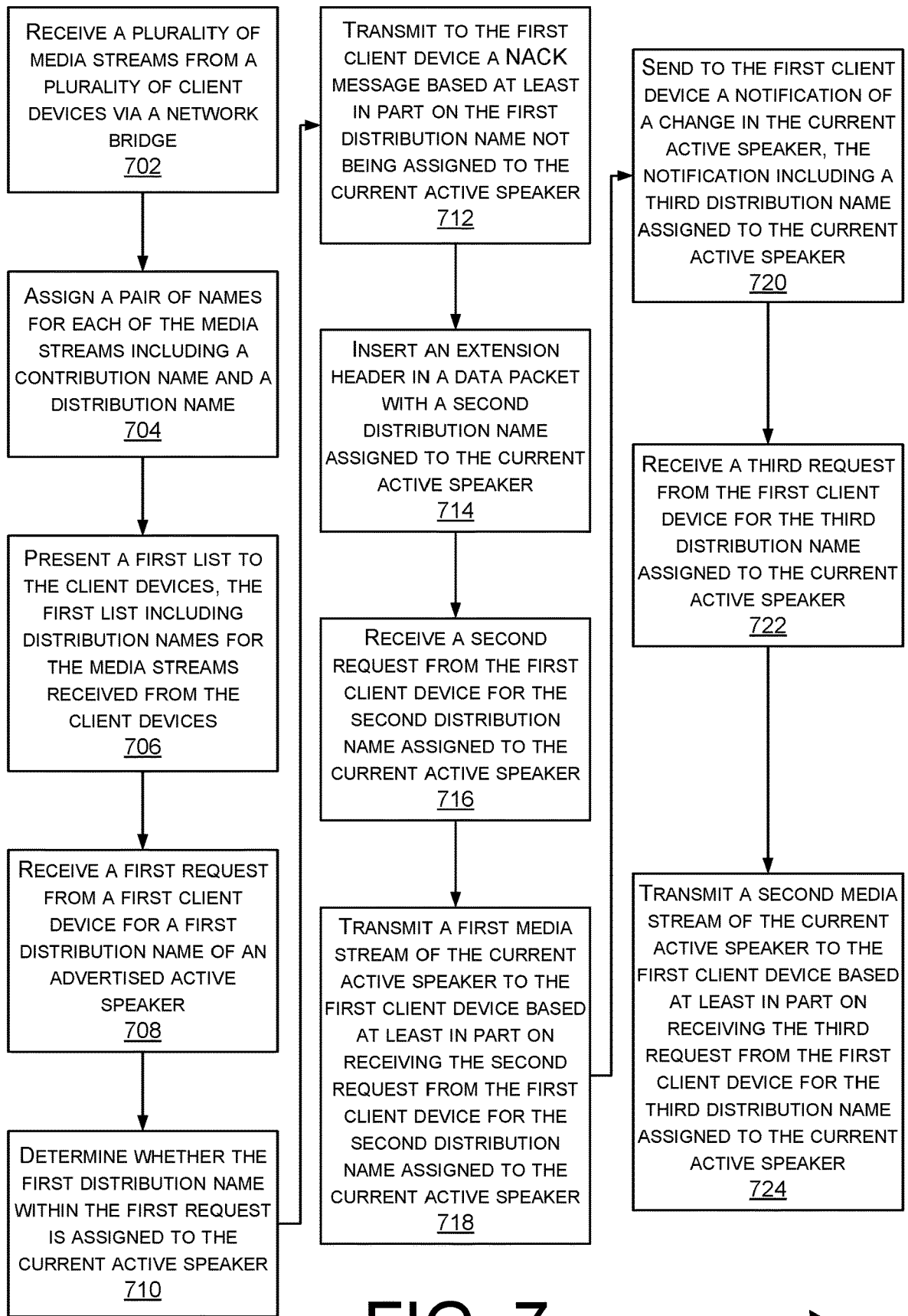
FIG. 7 illustrates a method of identifying an active speaker using a piggy backing process, according to an example of the principles described herein.

FIG. 7 illustrates a method of identifying an active speaker using the piggy backing process, according to an example of the principles described herein. The method 700 of FIG. 7 may include at the media bridge, receiving, at 702, a plurality of media streams from the plurality of client devices 104, and, at 704, assigning a pair of names for each of the media streams including the contribution name and the distribution name as described herein. The method 700 further includes, at 706, presenting a first list to the plurality of client devices 104.

At 708, the media bridge 102 may receive a first request from a client device for a first distribution name of an advertised active speaker. The media bridge 102 may determine whether the first distribution name within the first request is assigned to the current active speaker at 710. The method 700 further includes, at 712, transmitting to the client device 104, via the media bridge 102, a negative-acknowledgement (NACK) message based at least in part on the first distribution name not being assigned to the current active speaker. The media bridge 102 inserts an extension header in a data packet with a second distribution name assigned to the current active speaker at 714.

At 716 the media bridge 102 receives a second request from the client device 104 for the second distribution name assigned to the current active speaker. The method 700 further includes, at 718, transmitting a first media stream of the current active speaker to the client device 104 based at least in part on receiving the second request from the client device 104 for the second distribution name assigned to the current active speaker.

At 720, the method 700 further includes sending to the client device 104, via the media bridge 102, a notification of a change in the current active speaker. The notification may include a third distribution name assigned to the current active speaker. At 722, the media bridge 102 may receive a third request from the client device 104 for the third distribution name assigned to the current active speaker. The method 700, at 724, may further include transmitting a second media stream of the current active speaker to the client device 104 based at least in part on receiving the third request from the client device 104 for the third distribution name assigned to the current active speaker.

Receiving the first request at 708 may be performed based at least in part on a reception of the first distribution name from the media bridge 102 during a connection establishment between the client device 104 and the media bridge 102. The method further includes adding an active speaker (AS) flag to a header of the data packet sent by the media bridge 102 at 714 and/or at 720. The AS flag indicates the first distribution name of the advertised active speaker and the current active speaker, respectively.

Figure 8:
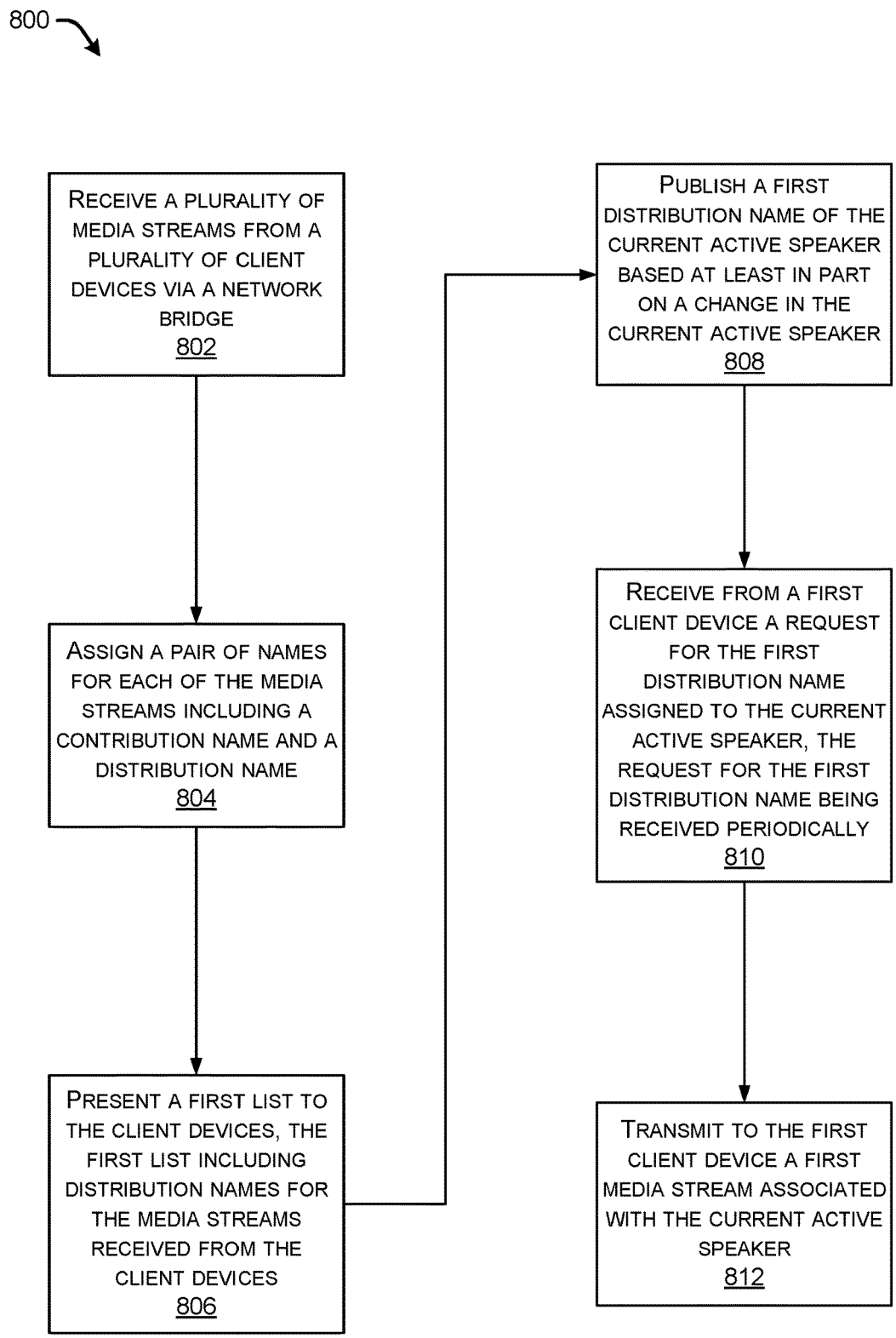
FIG. 8 illustrates a method of identifying an active speaker using a passive signaling process, according to an example of the principles described herein.

FIG. 8 illustrates a method 800 of identifying an active speaker using a passive signaling process, according to an example of the principles described herein. The method 800 of FIG. 8 may include at the media bridge, receiving, at 802, a plurality of media streams from the plurality of client devices 104, and, at 804, assigning a pair of names for each of the media streams including the contribution name and the distribution name as described herein. The method 800 further includes, at 806, presenting a first list to the plurality of client devices 104.

The signaling process of FIG. 8 may include a passive signaling process that includes, at 808, publishing, via the media bridge 102, a first distribution name of the current active speaker based at least in part on a change in the current active speaker. At 810, the method 800 further includes receiving from a client device 104 a request for the first distribution name assigned to the current active speaker. The request for the first distribution name may be received periodically. The method further includes transmitting to the client device 104 a first media stream associated with the current active speaker at 812.

Figure 9:
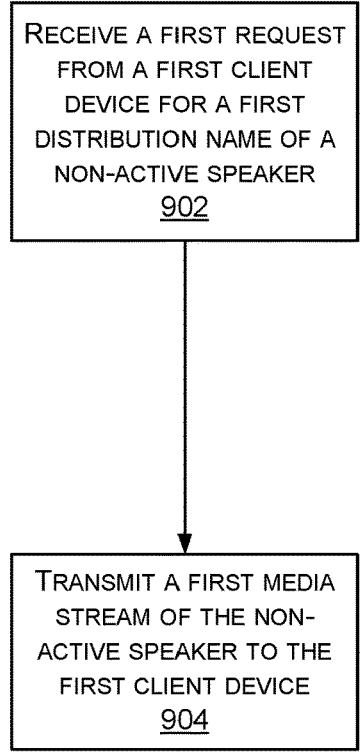
FIG. 9 illustrates a method of identifying a non-active speaker, according to an example of the principles described herein.

FIG. 9 illustrates a method 900 of identifying a non-active speaker, according to an example of the principles described herein. As described above, a user of a client device 104 is able to customize their respective UI by selecting a desired media stream produced by another client device 104 even in situations where that client device 104 is not an active speaker (e.g., is a non-active speaker). Thus, the method 900 of FIG. 9 may include receiving, via the media bridge 102, a first request from a client device 104 for a first distribution name of a non-active speaker at 902. The media bridge 102, at 904, may transmit a first media stream of the non-active speaker to the client device 104.

Figure 10:
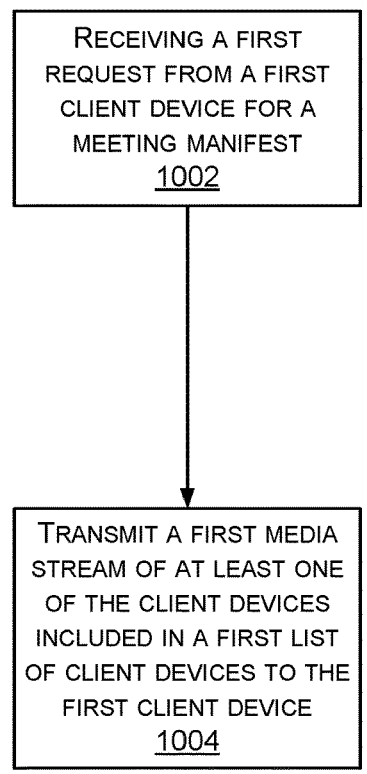
FIG. 10 illustrates a method of identifying an active speaker within a grouped meeting, according to an example of the principles described herein.

FIG. 10 illustrates a method 1000 of identifying an active speaker within a grouped meeting, according to an example of the principles described herein. The method 1000 of FIG. 10 may include receiving, via the media bridge 102, a first request from a client device 104 for a meeting manifest at 1002. As described above, the meeting manifest includes a first list of client devices among the plurality of client devices in a global meeting and a first plurality of distribution names associated with the first list of client devices, a list of groups included within the global meeting. The group manifest may include at least a second list of client devices included in each of the groups included in the list of groups and a second plurality of distribution names associated with the second list of client device. At 1004, the method further includes transmitting a first media stream of at least one of the client devices 104 included in the first list of client devices 104 to the client device 104. In one example, at least one of the groups included within the list of groups may be a private group. The private group is accessible using group encryption with each client device 104 included within the second list of client devices encrypting its respective media stream via a group shared encryption key.

Figure 11:
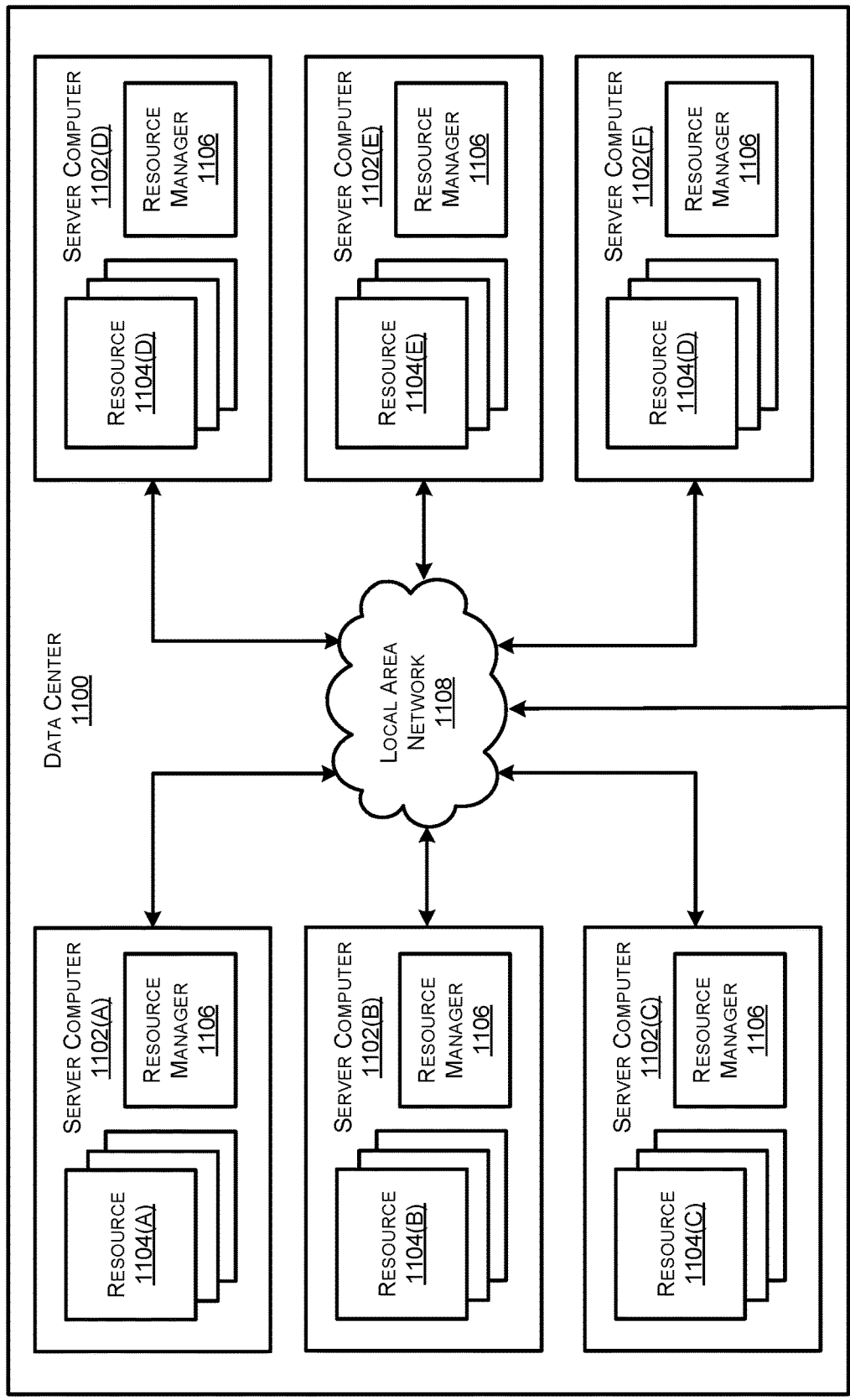
FIG. 11 illustrates a computing system diagram illustrating a configuration for a data center that may be utilized to implement aspects of the technologies disclosed herein.

FIG. 11 illustrates a computing system diagram illustrating a configuration for a data center 1100 that may be utilized to implement aspects of the technologies disclosed herein. The example data center 1100 shown in FIG. 11 includes several server computers 1102A-1102F (which might be referred to herein singularly as "a server computer 1102" or in the plural as "the server computers 1102) for providing computing resources. In one example, the resources and/or server computers 1102 may include, or correspond to, any type of networked device described herein. Although described as servers, the server computers 1102 may comprise any type of networked device, such as servers, switches, routers, hubs, bridges, gateways, modems, repeaters, access points, etc.

The server computers 1102 may be standard tower, rackmount, or blade server computers configured appropriately for providing computing resources. In one example, the server computers 1102 may provide computing resources 1104 including data processing resources such as VM instances or hardware computing systems, database clusters, computing clusters, storage clusters, data storage resources, database resources, networking resources, virtual private networks (VPNs), and others. Some of the server computers 1102 may also be configured to execute a resource manager 1106 capable of instantiating and/or managing the computing resources. In the case of VM instances, for example, the resource manager 1106 may be a hypervisor or another type of program configured to enable the execution of multiple VM instances on a single server computer 1102. Server computers 1102 in the data center 1100 may also be configured to provide network services and other types of services.

In the example data center 1100 shown in FIG. 11, an appropriate LAN 1108 is also utilized to interconnect the server computers 1102A-1102F. It may be appreciated that the configuration and network topology described herein has been greatly simplified and that many more computing systems, software components, networks, and networking devices may be utilized to interconnect the various computing systems disclosed herein and to provide the functionality described above. Appropriate load balancing devices or other types of network infrastructure components may also be utilized for balancing a load between data centers 1100, between each of the server computers 1102A-1102F in each data center 1100, and, potentially, between computing resources in each of the server computers 1102. It may be appreciated that the configuration of the data center 1100 described with reference to FIG. 11 is merely illustrative and that other implementations may be utilized.

In one example, the server computers 1102 and or the computing resources 1104 may each execute/host one or more tenant containers and/or virtual machines to perform techniques described herein.

In one example, the data center 1100 may provide computing resources, like tenant containers, VM instances, VPN instances, and storage, on a permanent or an as-needed basis. Among other types of functionality, the computing resources provided by a cloud computing network may be utilized to implement the various services and techniques described herein. The computing resources 1104 provided by the cloud computing network may include various types of computing resources, such as data processing resources like tenant containers and VM instances, data storage resources, networking resources, data communication resources, network services, VPN instances, and the like.

Each type of computing resource 1104 provided by the cloud computing network may be general-purpose or may be available in a number of specific configurations. For example, data processing resources may be available as physical computers or VM instances in a number of different configurations. The VM instances may be configured to execute applications, including web servers, application servers, media servers, database servers, some or all of the network services described above, and/or other types of programs. Data storage resources may include file storage devices, block storage devices, and the like. The cloud computing network may also be configured to provide other types of computing resources 1104 not mentioned specifically herein.

The computing resources 1104 provided by a cloud computing network may be enabled in one example by one or more data centers 1100 (which might be referred to herein singularly as "a data center 1100" or in the plural as "the data centers 1100). The data centers 1100 are facilities utilized to house and operate computer systems and associated components. The data centers 1100 typically include redundant and backup power, communications, cooling, and security systems. The data centers 1100 may also be located in geographically disparate locations. One illustrative example for a data center 1100 that may be utilized to implement the technologies disclosed herein is described herein with regard to, for example, FIGS. 1 through 10.

Figure 12:
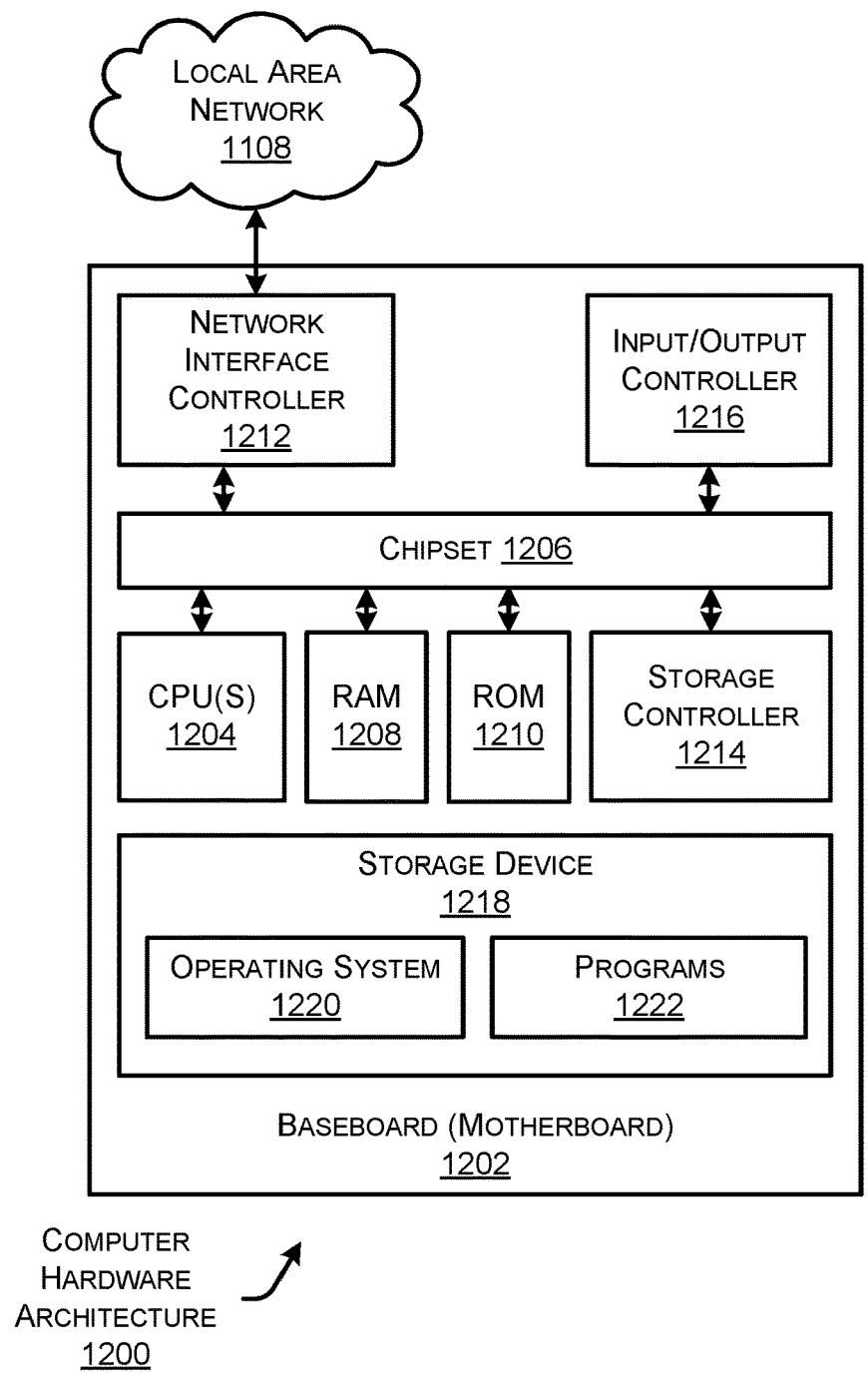
FIG. 12 illustrates a computer architecture diagram showing an example computer hardware architecture for implementing a computing device that may be utilized to implement aspects of the various technologies presented herein.

FIG. 12 illustrates a computer architecture diagram showing an example computer hardware architecture 1200 for implementing a computing device that may be utilized to implement aspects of the various technologies presented herein. The computer hardware architecture 1200 shown in FIG. 12 illustrates the media bridge 102, the client devices 104, the hICN-based RTC system 100, and/or other systems or devices associated with the media bridge 102, the client devices 104, the hICN-based RTC system 100 and/or remote from the media bridge 102, the client devices 104, the hICN-based RTC system 100, a workstation, a desktop computer, a laptop, a tablet, a network appliance, an e-reader, a smartphone, or other computing device, and may be utilized to execute any of the software components described herein. The computer 1200 may, in one example, correspond to a network device (e.g., the media bridge 102, the client devices 104, the hICN-based RTC system 100 (and associated devices) described herein, and may comprise networked devices such as servers, switches, routers, hubs, bridges, gateways, modems, repeaters, access points, etc.

The computer 1200 includes a baseboard 1202, or "motherboard," which is a printed circuit board to which a multitude of components or devices may be connected by way of a system bus or other electrical communication paths. In one illustrative configuration, one or more central processing units (CPUs) 1204 operate in conjunction with a chipset 1206. The CPUs 1204 may be standard programmable processors that perform arithmetic and logical operations necessary for the operation of the computer 1200.

The CPUs 1204 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 1206 provides an interface between the CPUs 1204 and the remainder of the components and devices on the baseboard 1202. The chipset 1206 may provide an interface to a RAM 1208, used as the main memory in the computer 1200. The chipset 1206 may further provide an interface to a computer-readable storage medium such as a read-only memory (ROM) 1210 or non-volatile RAM (NVRAM) for storing basic routines that help to startup the computer 1200 and to transfer information between the various components and devices. The ROM 1210 or NVRAM may also store other software components necessary for the operation of the computer 1200 in accordance with the configurations described herein.

The computer 1200 may operate in a networked environment using logical connections to remote computing devices and computer systems through a network, such as the media bridge 102, the client devices 104, the hICN-based RTC system 100, among other devices. The chipset 1206 may include functionality for providing network connectivity through a Network Interface Controller (NIC) 1212, such as a gigabit Ethernet adapter. The NIC 1212 is capable of connecting the computer 1200 to other computing devices within the media bridge 102, the client devices 104, and/or the hICN-based RTC system 100 and external to the media bridge 102, the client devices 104, and/or the hICN-based RTC system 100. It may be appreciated that multiple NICs 1212 may be present in the computer 1200, connecting the computer to other types of networks and remote computer systems. In one example, the NIC 1212 may be configured to perform at least some of the techniques described herein, such as packet redirects and/or other techniques described herein.

The computer 1200 may be connected to a storage device 1218 that provides non-volatile storage for the computer. The storage device 1218 may store an operating system 1220, programs 1222 (e.g., any computer-readable and/or computer-executable code described herein), and data, which have been described in greater detail herein. The storage device 1218 may be connected to the computer 1200 through a storage controller 1214 connected to the chipset 1206. The storage device 1218 may consist of one or more physical storage units. The storage controller 1214 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computer 1200 may store data on the storage device 1218 by transforming the physical state of the physical storage units to reflect the information being stored. The specific transformation of physical state may depend on various factors, in different examples of this description. Examples of such factors may include, but are not limited to, the technology used to implement the physical storage units, whether the storage device 1218 is characterized as primary or secondary storage, and the like.

For example, the computer 1200 may store information to the storage device 1218 by issuing instructions through the storage controller 1214 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1200 may further read information from the storage device 1218 by detecting the physical states or characteristics of one or more particular locations within the physical storage units.

In addition to the storage device 1218 described above, the computer 1200 may have access to other computer-readable storage media to store and retrieve information, such as program modules, data structures, or other data. It may be appreciated by those skilled in the art that computer-readable storage media is any available media that provides for the non-transitory storage of data and that may be accessed by the computer 1200. In one example, the operations performed by the media bridge 102, the client devices 104, the hICN-based RTC system 100, and or any components included therein, may be supported by one or more devices similar to computer 1200. Stated otherwise, some or all of the operations performed by the media bridge 102, the client devices 104, the hICN-based RTC system 100, and or any components included therein, may be performed by one or more computer devices operating in a cloud-based arrangement.

By way of example, and not limitation, computer-readable storage media may include volatile and non-volatile, removable and non-removable media implemented in any method or technology. Computer-readable storage media includes, but is not limited to, RAM, ROM, erasable programmable ROM (EPROM), electrically-erasable programmable ROM (EEPROM), flash memory or other solid-state memory technology, compact disc ROM (CD-ROM), digital versatile disk (DVD), high definition DVD (HD-DVD), BLU-RAY, or other optical storage, magnetic cassettes, magnetic tape, magnetic disk storage or other magnetic storage devices, or any other medium that may be used to store the desired information in a non-transitory fashion.

As mentioned briefly above, the storage device 1218 may store an operating system 1220 utilized to control the operation of the computer 1200. According to one example, the operating system 1220 comprises the LINUX operating system. According to another example, the operating system comprises the WINDOWS® SERVER operating system from MICROSOFT Corporation of Redmond, Washington. According to further examples, the operating system may comprise the UNIX operating system or one of its variants. It may be appreciated that other operating systems may also be utilized. The storage device 1218 may store other system or application programs and data utilized by the computer 1200.

In one example, the storage device 1218 or other computer-readable storage media is encoded with computer-executable instructions which, when loaded into the computer 1200, transform the computer from a general-purpose computing system into a special-purpose computer capable of implementing the examples described herein. These computer-executable instructions transform the computer 1200 by specifying how the CPUs 1204 transition between states, as described above. According to one example, the computer 1200 has access to computer-readable storage media storing computer-executable instructions which, when executed by the computer 1200, perform the various processes described above with regard to FIGS. 1 through 10. The computer 1200 may also include computer-readable storage media having instructions stored thereupon for performing any of the other computer-implemented operations described herein.

The computer 1200 may also include one or more input/output controllers 1216 for receiving and processing input from a number of input devices, such as a keyboard, a mouse, a touchpad, a touch screen, an electronic stylus, or other type of input device. Similarly, an input/output controller 1216 may provide output to a display, such as a computer monitor, a flat-panel display, a digital projector, a printer, or other type of output device. It will be appreciated that the computer 1200 might not include all of the components shown in FIG. 12, may include other components that are not explicitly shown in FIG. 12, or might utilize an architecture completely different than that shown in FIG. 12.

As described herein, the computer 1200 may comprise one or more of the media bridge 102, the client devices 104, the hICN-based RTC system 100, and/or other systems or devices associated with the client device 104 and/or remote from the client device 104. The computer 1200 may include one or more hardware processor(s) such as the CPUs 1204 configured to execute one or more stored instructions. The CPUs 1204 may comprise one or more cores. Further, the computer 1200 may include one or more network interfaces configured to provide communications between the computer 1200 and other devices, such as the communications described herein as being performed by the media bridge 102, the client devices 104, the hICN-based RTC system 100, and other devices described herein. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 1222 may comprise any type of programs or processes to perform the techniques described in this disclosure for the media bridge 102, the client devices 104, the hICN-based RTC system 100 as described herein. The programs 1222 may enable the devices described herein to perform various operations.

CONCLUSION

The examples described herein provide systems and methods to track an active speaker at a plurality of client devices 104 while using a global naming scheme in order to offer a fully customizable layouts at the client devices 104. The present systems and methods further eliminate duplication of media streams at the media bridge 102 which provides a scalable communication model. Further, the present systems and methods distribute to the client devices 104 a list of all available media streams as produced by the client devices 104 in the RTC instance (e.g., a videoconference). Still further, the present systems and methods provide for the management of in-meeting groups and intra-group meeting management.

While the present systems and methods are described with respect to the specific examples, it is to be understood that the scope of the present systems and methods are not limited to these specific examples. Since other modifications and changes varied to fit particular operating requirements and environments will be apparent to those skilled in the art, the present systems and methods are not considered limited to the example chosen for purposes of disclosure, and covers all changes and modifications which do not constitute departures from the true spirit and scope of the present systems and methods.

Although the application describes examples having specific structural features and/or methodological acts, it is to be understood that the claims are not necessarily limited to the specific features or acts described. Rather, the specific features and acts are merely illustrative of some examples that fall within the scope of the claims of the application.

What is claimed is:

1. A method performed by a communication platform configured to distribute a plurality of media streams among a plurality of client devices connected to the communication platform over one or more networks, the method comprising:

receiving the plurality of media streams from the plurality of client devices at the communication platform, the communication platform connecting the plurality of client devices in a communication session;

assigning a pair of names to each of the plurality of media streams, each of the pair of names including a contribution name and a distribution name;

causing presentation, on a first device of the plurality of client devices, a list including at least subset of the distribution names of the plurality of media streams;

causing presentation, on the first device, a first indication of a first distribution name corresponding to an active speaker and a second indication of a second distribution name corresponding to an inactive speaker;

receiving input indicating a selection of the second distribution name corresponding to the inactive speaker;

causing presentation, on the first device, of a first media stream corresponding to the inactive speaker.

2. The method of claim 1, further comprising causing presentation, on the first device, of a second media stream corresponding to the active speaker concurrently with the first media stream being presented.

3. The method of claim 1, further comprising:

causing presentation, on the first device, of a second media stream corresponding to the active speaker;

receiving additional input indicating a selection of a third distribution name corresponding to another inactive speaker; and causing presentation, on the first device, of a third media stream corresponding to the other inactive speaker, wherein the first media stream, the second media stream, and the third media stream are presented concurrently on the first device for a period of time.

4. The method of claim 1, further comprising:

receiving a first request from a second device of the plurality of client devices for a third distribution name of the active speaker;

determining whether the third distribution name is assigned to the active speaker;

transmitting to the second device a negative-acknowledgement (NACK) message based at least in part on the third distribution name not being assigned to the active speaker;

inserting an extension header in a data packet with the first distribution name assigned to the active speaker;

receiving a second request from the second device for the first distribution name assigned to the active speaker; and transmitting a second media stream of the active speaker to the second device based at least in part on receiving the second request from the second device.

5. The method of claim 4, further comprising:

sending, to the second client device, a notification of a change in a current active speaker, the notification including a third distribution name assigned to the current active speaker;

receiving a third request from the second client device for the third distribution name assigned to the current active speaker; and transmitting a second media stream of the current active speaker to the second client device.

6. The method of claim 1, further comprising:

publishing the first distribution name of the active speaker based at least in part on a change in a current active speaker;

receiving, from a second device, a request for the first distribution name assigned to the current active speaker, the request for the first distribution name being received periodically; and transmitting, to the second device, a first media stream associated with the current active speaker.

7. The method of claim 1, wherein:
the contribution names define first indicators used by the communication platform to retrieve the plurality of media streams of the plurality of client devices, and
the distribution names define second indicators advertised to identify each of the plurality of client devices.

8. The method of claim 1, wherein the plurality of media streams are received via an information-centric networking (ICN)-based, real-time communication (RTC) platform.

9. A communication system configured to distribute a plurality of media streams among a plurality of client devices connected to the communication system over one or more networks, the communication system comprising:
one or more processors; and
one or more non-transitory computer-readable media storing computer-executable instructions that, when executed by the one or more processors, cause the one or more processors to perform operations comprising:
receiving the plurality of media streams from the plurality of client devices at the communication platform, the communication system connecting the plurality of client devices in a communication session;
assigning a pair of names to each of the plurality of media streams, each of the pair of names including a contribution name and a distribution name;
causing presentation, on a first device of the plurality of client devices, a list including at least subset of the distribution names of the plurality of media streams;
causing presentation, on the first device, a first indication of a first distribution name corresponding to an active speaker and a second indication of a second distribution name corresponding to an inactive speaker;
receiving input indicating a selection of the second distribution name corresponding to the inactive speaker;
causing presentation, on the first device, of a first media stream corresponding to the inactive speaker.

10. The communication system of claim 9, the operations further comprising causing presentation, on the first device, of a second media stream corresponding to the active speaker concurrently with the first media stream being presented.

11. The communication system of claim 9, the operations further comprising:
causing presentation, on the first device, of a second media stream corresponding to the active speaker;
receiving additional input indicating a selection of a third distribution name corresponding to another inactive speaker; and
causing presentation, on the first device, of a third media stream corresponding to the other inactive speaker,
wherein the first media stream, the second media stream, and the third media stream are presented concurrently on the first device for a period of time.

12. The communication system of claim 9, the operations further comprising:
receiving a first request from a second device of the plurality of client devices for a third distribution name of the active speaker;
determining whether the third distribution name is assigned to the active speaker;

transmitting to the second device a negative-acknowledgement (NACK) message based at least in part on the third distribution name not being assigned to the active speaker;
inserting an extension header in a data packet with the first distribution name assigned to the active speaker;
receiving a second request from the second device for the first distribution name assigned to the active speaker; and
transmitting a second media stream of the active speaker to the second device based at least in part on receiving the second request from the second device.

13. The communication system of claim 12, the operations further comprising:
sending, to the second client device, a notification of a change in a current active speaker, the notification including a third distribution name assigned to the current active speaker;
receiving a third request from the second client device for the third distribution name assigned to the current active speaker; and
transmitting a second media stream of the current active speaker to the second client device.

14. The communication system of claim 9, the operations further comprising:
publishing the first distribution name of the active speaker based at least in part on a change in a current active speaker;
receiving, from a second device, a request for the first distribution name assigned to the current active speaker, the request for the first distribution name being received periodically; and
transmitting, to the second device, a first media stream associated with the current active speaker.

15. The communication system of claim 9, wherein:
the contribution names define first indicators used by the communication platform to retrieve the plurality of media streams of the plurality of client devices, and
the distribution names define second indicators advertised to identify each of the plurality of client devices.

16. The communication system of claim 9, wherein the plurality of media streams are received via an information-centric networking (ICN)-based, real-time communication (RTC) platform.

17. One or more non-transitory computer-readable media of a communication platform configured to distribute a plurality of media streams among a plurality of client devices connected to the communication platform over one or more networks, the one or more non-transitory computer-readable media storing computer-executable instructions that, when executed by one or more processors, cause the communication platform processors to perform operations comprising:
receiving the plurality of media streams from the plurality of client devices at the communication platform, the communication platform connecting the plurality of client devices in a communication session;
assigning a pair of names to each of the plurality of media streams, each of the pair of names including a contribution name and a distribution name;
causing presentation, on a first device of the plurality of client devices, a list including at least subset of the distribution names of the plurality of media streams;
causing presentation, on the first device, a first indication of a first distribution name corresponding to an active speaker and a second indication of a second distribution name corresponding to an inactive speaker;

receiving input indicating a selection of the second distribution name corresponding to the inactive speaker;

causing presentation, on the first device, of a first media stream corresponding to the inactive speaker.

18. The one or more non-transitory computer-readable media of claim 17, the operations further comprising causing presentation, on the first device, of a second media stream corresponding to the active speaker concurrently with the first media stream being presented.

19. The one or more non-transitory computer-readable media of claim 17, the operations further comprising:

causing presentation, on the first device, of a second media stream corresponding to the active speaker;

receiving additional input indicating a selection of a third distribution name corresponding to another inactive speaker; and causing presentation, on the first device, of a third media stream corresponding to the other inactive speaker, wherein the first media stream, the second media stream, and the third media stream are presented concurrently on the first device for a period of time.

20. The one or more non-transitory computer-readable media of claim 17, the operations further comprising:

causing presentation, on the first device, of a second media stream corresponding to the active speaker;

receiving additional input indicating a selection of a third distribution name corresponding to another inactive speaker; and causing presentation, on the first device, of a third media stream corresponding to the other inactive speaker, wherein the first media stream, the second media stream, and the third media stream are presented concurrently on the first device for a period of time.

* * * * *